(12) United States Patent
Obayashi et al.

(10) Patent No.: US 11,901,741 B2
(45) Date of Patent: Feb. 13, 2024

(54) WIRELESS POWER TRANSFER SYSTEM

(71) Applicant: DENSO CORPORATION, Kariya (JP)

(72) Inventors: Kazuyoshi Obayashi, Kariya (JP); Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 17/583,926

(22) Filed: Jan. 25, 2022

(65) Prior Publication Data

US 2022/0149665 A1    May 12, 2022

Related U.S. Application Data

(63) Continuation of application No. PCT/JP2020/023552, filed on Jun. 16, 2020.

(30) Foreign Application Priority Data

Jul. 25, 2019 (JP) .................................. 2019-136682
Jun. 9, 2020 (JP) .................................. 2020-099782

(51) Int. Cl.
*H02J 50/12* (2016.01)
*H02J 50/90* (2016.01)
*H02J 7/02* (2016.01)
*H02J 50/50* (2016.01)

(52) U.S. Cl.
CPC ............. *H02J 50/12* (2016.02); *H02J 50/50* (2016.02); *H02J 7/02* (2013.01); *H02J 50/90* (2016.02); *H02J 2207/20* (2020.01)

(58) Field of Classification Search
CPC .. H02J 50/12; H02J 50/50; H02J 50/90; H02J 2207/20; H02J 7/02
USPC ......................................................... 307/104
See application file for complete search history.

(56) References Cited

U.S. PATENT DOCUMENTS

2017/0229912 A1\* 8/2017 Bae .......................... H02J 50/70

FOREIGN PATENT DOCUMENTS

JP          2019-071719 A    5/2019

\* cited by examiner

*Primary Examiner* — Michael R. Fin
(74) *Attorney, Agent, or Firm* — Oliff PLC

(57) ABSTRACT

A power supplying device includes a power transmission circuit transmitting AC power and a power transmission resonance circuit including a power transmission coil. A power receiving device includes a power reception resonance circuit including a power reception coil. When a coupling coefficient between the power transmission coil and the power reception coil is a predetermined coupling coefficient, resonance of a first resonance mode having a first resonance frequency and a second resonance mode having a second resonance frequency are generated, a resonance frequency of the power transmission resonance circuit and the power reception resonance circuit is set to a value which is one of the first and second resonance frequencies, and the set value is a frequency deviating from a reference resonance frequency of the power transmission resonance circuit alone by a predetermined deviation frequency or more. A driving frequency of the AC power is set to the set value.

18 Claims, 15 Drawing Sheets

FIG.2
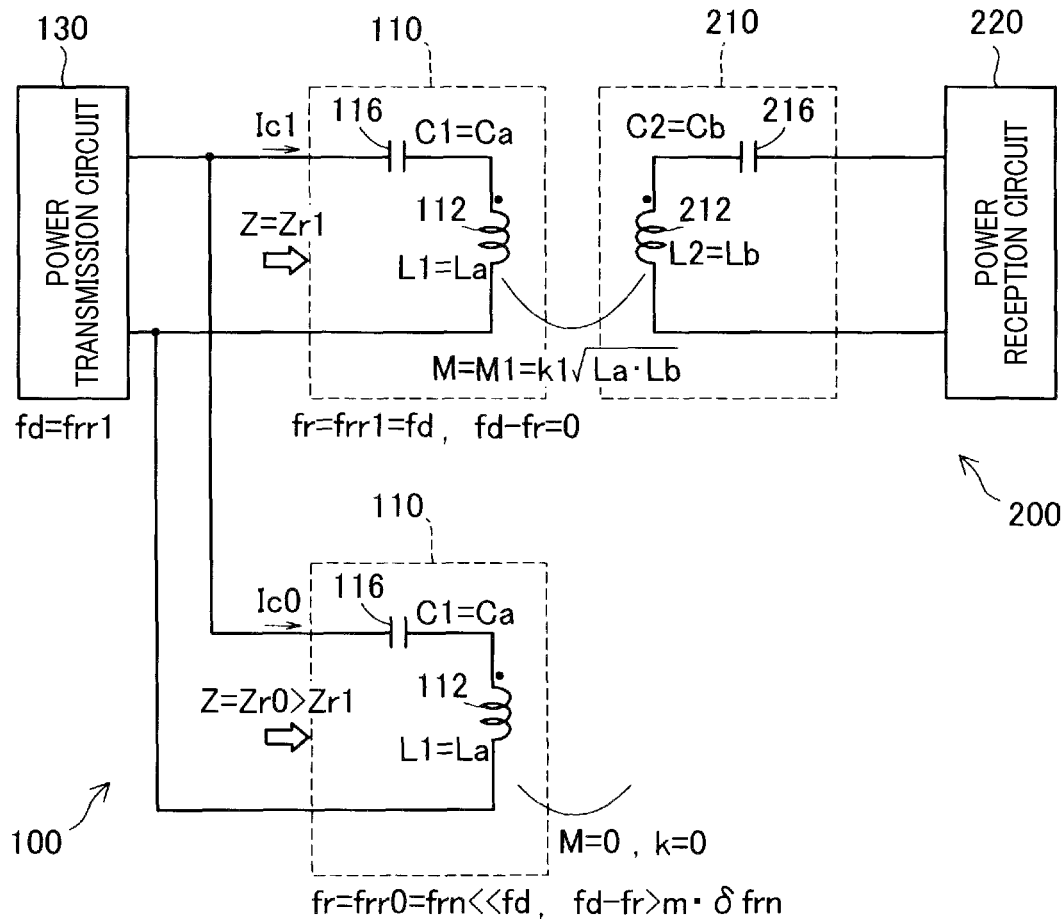
FIG.3
MAGNETIC FLUX PENETRATION MODE: RESONANCE FREQUENCY frp
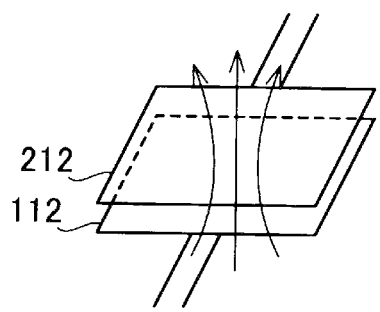
MAGNETIC FLUX REPULSION MODE: RESONANCE FREQUENCY frr
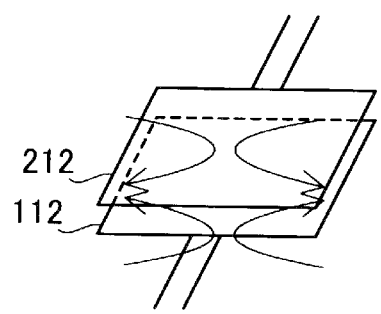

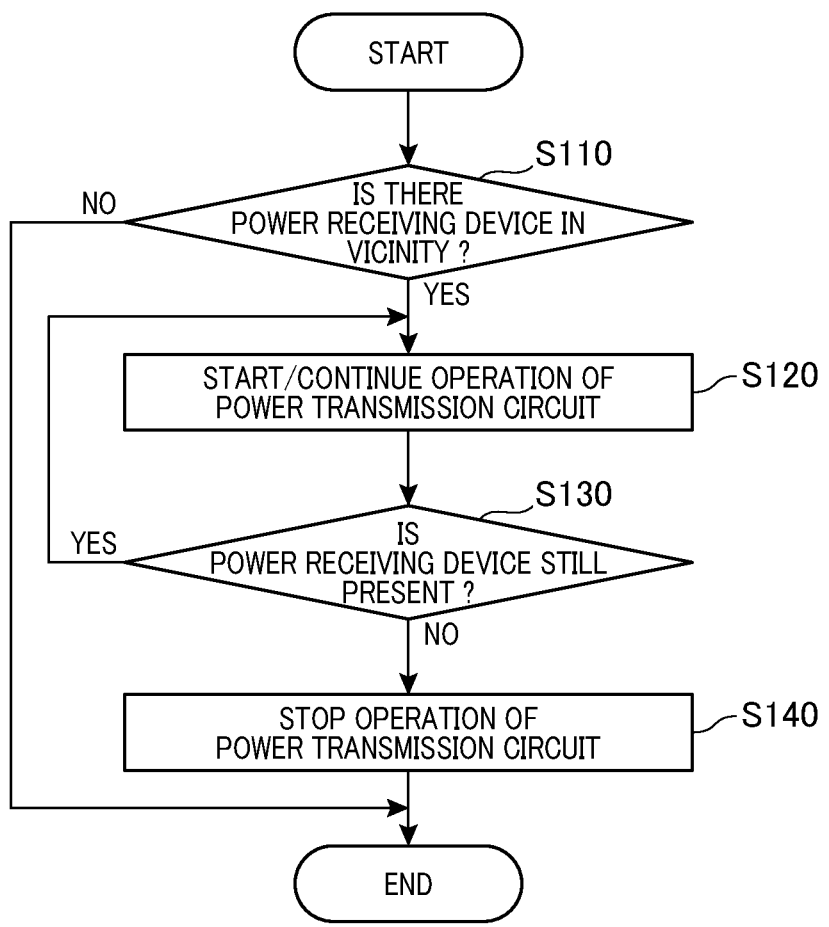
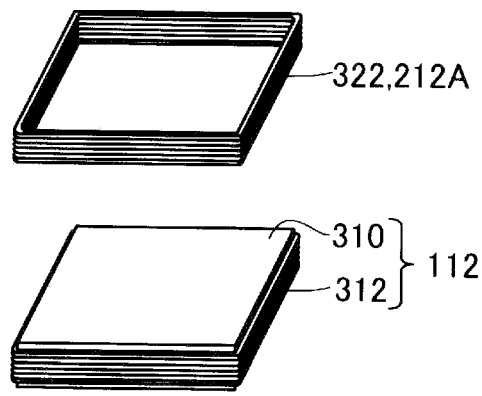

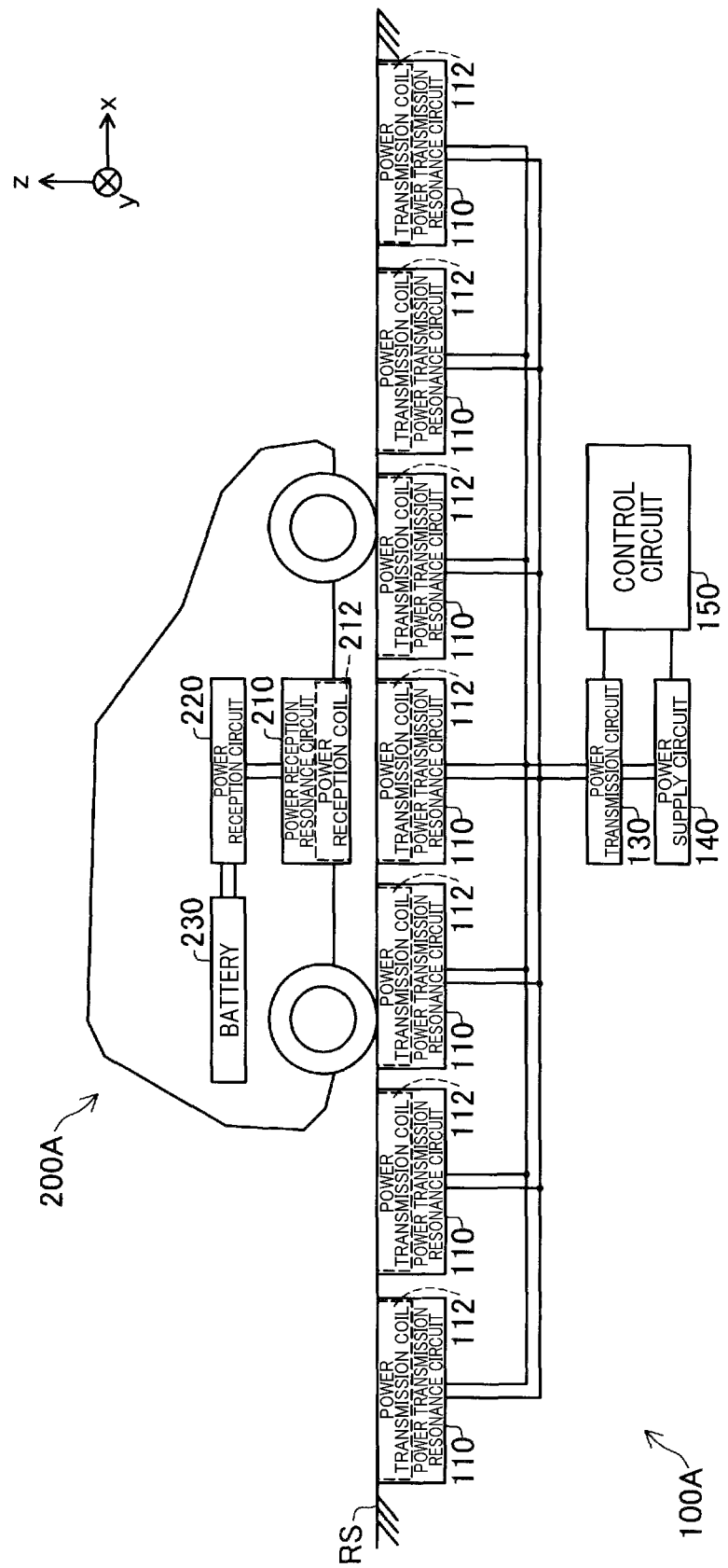

WIRELESS POWER TRANSFER SYSTEM

CROSS-REFERENCE TO RELATED APPLICATION

The present application is a continuation application of International Application No. PCT/JP2020/023552, filed on Jun. 16, 2020, which claims priority to Japanese Patent Application No. 2019-136682 filed on Jul. 25, 2019, and Japanese Patent Application No. 2020-99782 filed on Jun. 9, 2020. The contents of these applications are incorporated herein by reference in their entirety.

BACKGROUND

Technical Field

The present disclosure relates to a wireless power transfer system.

Background Art

A wireless power transfer system including a plurality of power transmission coils connected in parallel to a high-frequency power source and a power reception coil provided in a movable object is disclosed. A current control element (for example, a saturable reactor) is placed between the high-frequency power supply and each power transmission coil. The impedance of the current control element increases when the current flowing from the high-frequency power supply to the power transmission coil is less than a threshold, and the impedance decreases when the current flowing from the high-frequency power supply to the power transmission coil exceeds the threshold. As a result, the impedance of the current control elements of the power transmission coils not facing the power reception coil rises so as to suppress the current supply from the high-frequency power source to these power transmission coils.

SUMMARY

In the present disclosure, provided is a wireless power transfer system as the following. A power supplying device includes a power transmission circuit configured to transmit AC power, and a power transmission resonance circuit configured to include a power transmission coil. The power receiving device includes a power reception resonance circuit including a power reception coil. in a state where a coupling coefficient between the power transmission coil and the power reception coil is a predetermined coupling coefficient, resonance of a first resonance mode and resonance of a second resonance mode are generated in the power transmission resonance circuit and the power reception resonance circuit, and the first resonance mode has a first resonance frequency and the second resonance mode has a second resonance frequency, the second resonance frequency being higher than the first resonance frequency, a resonance frequency of the power transmission resonance circuit and the power reception resonance circuit is set to a value which is one of the first resonance frequency and the second resonance frequency, and the set value is a frequency which deviates from a reference resonance frequency of the power transmission resonance circuit alone by a predetermined deviation frequency or more. A driving frequency of the AC power is set to the set value which is one of the first and second resonance frequencies and is set as the resonance frequency of the power transmission resonance circuit and the power reception resonance circuit.

BRIEF DESCRIPTION OF THE DRAWINGS

The above and other objects, features, and advantages of the present disclosure will become clearer from the following detailed description with reference to the accompanying drawings. In the drawings.

FIG. 2 is a circuit diagram of a power transmission resonance circuit and a power reception resonance circuit;

FIG. 3 is an explanatory diagram showing a comparison of two magnetic field coupling modes generated between a power transmission resonance circuit and a power reception resonance circuit;

FIG. 6 is a flowchart showing the procedures for controlling the operation of the power transmission circuit;

FIG. 7 is an explanatory diagram showing examples of the structures of the power transmission coil and the power reception coil;

FIG. 26 is a general configuration diagram of a wireless power transfer system for vehicles.

DETAILED DESCRIPTION OF THE PREFERRED EMBODIMENTS

Figure 1:
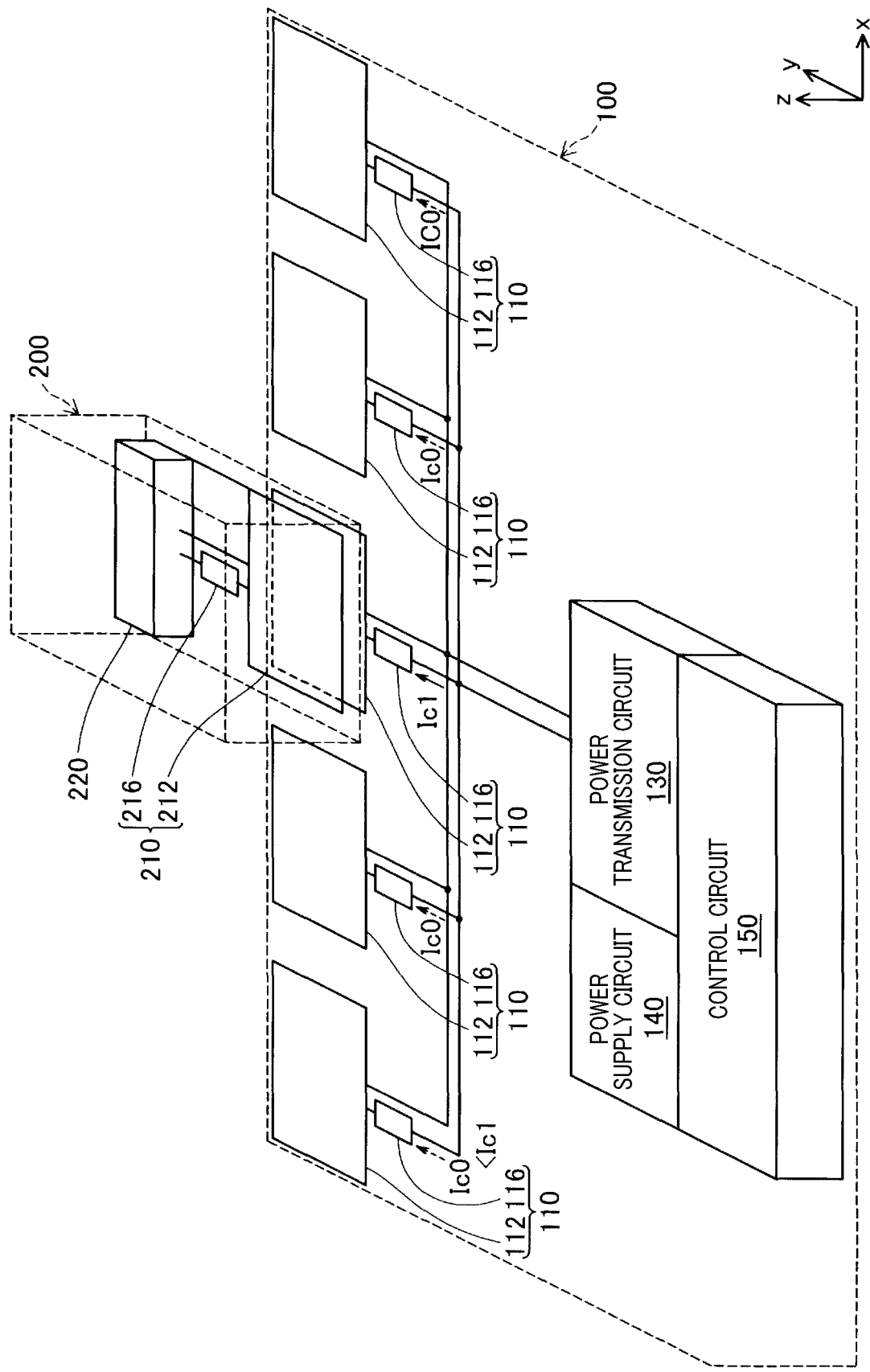
FIG. 1 is a general configuration diagram of a wireless power transfer system.

JP 2019-71719 A discloses a wireless power transfer system including a plurality of power transmission coils connected in parallel to a high-frequency power source and a power reception coil provided in a movable object.

However, in the configuration of the prior art, in addition to the power transmission coil and the resonance capacitor forming a power transmission resonance circuit for contactless power supply, a current control element whose impedance changes is required. Further, since a saturable reactor, which is being mentioned as an example of the current control element, needs to have a large inductance in order to increase the impedance, the size of the saturable reactor used as the current control element becomes large.

According to a first aspect of the present disclosure, a wireless power transfer system configured to wirelessly supply power from a power supplying device to a power receiving device is provided. The power supplying device of this wireless power transfer system includes a power transmission circuit configured to transmit AC power, and a power transmission resonance circuit configured to include a power transmission coil. The power receiving device includes a power reception resonance circuit including a power reception coil. In a state where a coupling coefficient between the power transmission coil and the power reception coil is a predetermined coupling coefficient, resonance of a first resonance mode and resonance of a second resonance mode are generated in the power transmission resonance circuit and the power reception resonance circuit, and the first resonance mode has a first resonance frequency and the second resonance mode has a second resonance frequency, the second resonance frequency being higher than the first resonance frequency, a resonance frequency of the power transmission resonance circuit and the power reception resonance circuit is set to a value which is one of the first resonance frequency and the second resonance frequency, and the set value is a frequency which deviates from a reference resonance frequency of the power transmission resonance circuit alone by a predetermined deviation frequency or more. A driving frequency of the AC power is set to the set value which is one of the first and second resonance frequencies and is set as the resonance frequency of the power transmission resonance circuit and the power reception resonance circuit.

According to the wireless power transfer system of this aspect, when the positions of the power transmission coil and the power reception coil become relatively close to each other, and the coupling coefficient increases and reaches a predetermined coupling coefficient, an alternating current having the driving frequency flows through the power transmission resonance circuit. The power transmission resonance circuit resonates, and power is supplied from the power supplying device to the power receiving device by the magnetic field coupling between the power transmission resonance circuit and the power reception resonance circuit. Meanwhile, when the positions of the power transmission coil and the power reception coil have become relatively far from each other and the coupling coefficient has decreased, even when an alternating current having the driving frequency flows, since the driving frequency is deviated from the reference driving frequency of the power transmission resonance circuit alone by a predetermined deviation frequency or more, the power transmission resonance circuit does not resonate, and the power supply from the power supplying device to the power receiving device is suppressed. This makes it possible to control the supply and suppression of power from the power transmission circuit to the power transmission resonance circuit according to the positions of the power transmission coil and the power reception coil. The need for large components such as the current control element of the prior art can be eliminated. In addition, it is possible to reduce the leakage of magnetic flux caused by a current flowing through the power transmission coil and improve the power transmission efficiency.

According to a second aspect of the present disclosure, a wireless power transfer system configured to wirelessly supply power from a power supplying device to a power receiving device is provided. The power supplying device of this wireless power transfer system includes a power transmission circuit configured to transmit AC power, and a power transmission resonance circuit configured to include a power transmission coil. The power receiving device includes a power reception resonance circuit including a power reception coil. At least one relay resonance circuit is arranged between the power transmission coil and the power reception coil, the relay resonance circuit includes at least one relay coil. In a state where a coupling coefficient between the coils included in two adjacent resonance circuits of the power transmission resonance circuit, the relay resonance circuit, and the power reception resonance circuit is a predetermined coupling coefficient, resonance of a first resonance mode and resonance of a second resonance mode are generated in the two adjacent resonance circuits, and the first resonance mode has a first resonance frequency and the second resonance mode has a second resonance frequency, the second resonance frequency being higher than the first resonance frequency, a resonance frequency of the two adjacent resonance circuits is set to a value which is one of the first resonance frequency and the second resonance frequency, and the set value is a frequency which deviates from a corresponding reference resonance frequency by a predetermined deviation frequency or more, and a resonance frequency of a resonance circuit other than the two adjacent resonance circuits is set to a reference resonance frequency. A driving frequency of the AC power is set to the set value which is one of the first and second resonance frequencies and is set as the resonance frequency of the power transmission resonance circuit and the power reception resonance circuit.

As with the first aspect, the second aspect also makes it possible to control the supply and suppression of power from the power transmission circuit to the power transmission resonance circuit according to the positions of the power transmission coil and the power reception coil. The need for large components such as the current control element of the prior art can be eliminated. In addition, it is possible to reduce the leakage of magnetic flux caused by a current flowing through the power transmission coil and improve the power transmission efficiency.

A. First Embodiment

FIG. 1 shows, as the first embodiment of a wireless power transfer system, a configuration including a power supplying device 100 and a power receiving device 200.

The power supplying device 100 includes a control circuit 150, a power supply circuit 140, a power transmission circuit 130, and a plurality of power transmission resonance circuits 110 connected in parallel to the power transmission circuit 130. FIG. 1 shows an example in which five power transmission resonance circuits 110 are connected in parallel to the power transmission circuit 130.

Each power transmission resonance circuit 110 includes a power transmission coil 112 and a resonance capacitor 116. The power transmission circuit 130 is a circuit that converts the DC power supplied from the power supply circuit 140 into AC power having a predetermined driving frequency and supplies it to the power transmission resonance circuits 110 that supply power to the power receiving device 200. The power transmission circuit 130 is configured as, for example, an inverter circuit. The power supply circuit 140 is configured as, for example, an AC/DC converter circuit that rectifies the AC voltage of an external power supply and outputs a DC voltage. The control circuit 150 controls the operating state of the power transmission circuit 130 and the power supply circuit 140.

In FIG. 1, the x direction indicates the horizontal direction in which the power transmission coils 112 of the transmission resonance circuits 110 are arranged, the y direction indicates the horizontal direction perpendicular to the x direction, and the z direction indicates the upward direction perpendicular to the x direction and the y direction.

The power receiving device 200 can be any of the various devices that operate using electric power, such as electronic devices and electric vehicles. The power receiving device 200 includes a power reception resonance circuit 210 that receives power using magnetic field coupling with a power transmission resonance circuit 110, and a power reception circuit 220. The power reception resonance circuit 210 is a circuit including a power reception coil 212 and a resonance capacitor 216, and obtains AC power induced in the power reception coil 212 using magnetic field coupling with the power transmission resonance circuit 110. The power reception circuit 220 is, for example, a circuit that converts AC power obtained by the power reception resonance circuit 210 into DC power to charge the battery as a load. The power charged in the battery is used as the power for operating the power receiving device.

Note that FIG. 1 shows, as an example, a state in which the power reception coil 212 of the power receiving device 200 is placed above the power transmission coil 112 at the center of the power supplying device 100. The size of the coil surface of the power transmission coil 112 facing the power reception coil 212 side is being illustrated as the same as the size of the coil surface of the power reception coil 212 facing the power transmission coil 112 side. The coil surface is a surface surrounded by looped wiring and serves as a looped coil, and it is basically a surface along the xy plane in FIG. 1. However, the size of the coil surface of the power reception coil 212 may be smaller or larger than the size of the coil surface of the power transmission coil 112 as long as their resonance frequencies are set to the same frequency using resonance capacitors. In this case, it is also possible to transfer power between a plurality of power transmission coils and one power reception coil.

A current Ic1 having a driving frequency is supplied from the power transmission circuit 130 to the power transmission coil 112 at the center below the power reception coil 212. In this case, power is supplied to the power receiving device 200 by causing an alternating current induced by magnetic coupling between the power reception coil 212 and the power transmission coil 112, which will be described later, to flow through the power reception coil 212. On the other hand, only a current Ic0 which is smaller than the current Ic1 flows through the other power transmission coils 112, which prevents unnecessary power consumption in the power transmission resonance circuits 110 having the power transmission coils 112 above which no power reception coil 212 is placed. In addition, by reducing the current Ic0 flowing through the power transmission coils 112 above which no power reception coil 212 is placed, it is possible to reduce the leakage of magnetic flux and improve the power transmission efficiency. The difference between a power transmission resonance circuit 110 having a power transmission coil 112 above which the power reception coil 212 is placed, and a power transmission resonance circuit 110 having a power transmission coil 112 above which no power reception coil 212 is placed will be described below.

FIG. 2 shows a power transmission resonance circuit 110 having a power transmission coil 112 placed so that it overlaps the power reception coil 212 of the power receiving device 200 in the z direction, and a power transmission resonance circuit 110 having a power transmission coil 112 placed so that it does not overlap the power reception coil 212 in the z direction.

Each power transmission resonance circuit 110 includes a power transmission coil 112 and a resonance capacitor 116 connected in series. As with the power transmission resonance circuit 110, the power reception resonance circuit 210 also includes a power reception coil 212 and a resonance capacitor 216 connected in series. The series-series capacitor configuration (also referred to as "SS configuration") is applied to the power transmission resonance circuit 110 and the power reception resonance circuit 210. Further, the wireless power transfer configuration is applied in which the power transmission side has a single-phase power transmission coil 112 and the power reception side has a single-phase power reception coil 212.

The degree of power transmission by the magnetic field coupling between the power transmission coil 112 and the power reception coil 212 changes depending on the coupling coefficient k indicating the magnitude of the magnetic coupling between the power transmission coil 112 and the power reception coil 212. The coupling coefficient k changes depending on the relative positional relationship between the center position of the coil surface of the power transmission coil 112 and the center position of the coil surface of the power reception coil 212 (the distances in the three-dimensional directions of FIG. 1, i.e., the x-, y-, and z-directions). For example, the larger the distance in the x-direction, the smaller the coupling coefficient k, and the smaller the distance in the x-direction, the larger the coupling coefficient k. The same applies to the other directions. The electric power that can be received by the power reception coil 212 is maximized when the coupling coefficient k has a certain value. However, the actual received power is set in accordance with the load (not shown).

Therefore, the circuit constants of the power transmission resonance circuit 110 and the circuit constants of the power reception resonance circuit 210 are set as described below in a state where the coupling coefficient k has a predetermined value k1 (1>k1>0). A state where the coupling coefficient k has a predetermined value k1 refers to a state where the relative positions of the center of the coil surface of the power transmission coil 112 and the center of the coil surface of the power reception coil 212 coincide with a predetermined value in the x-direction, the y-direction, and the z-direction (the state where the so-called power transmission side coil and power reception side coil are facing each other with a certain gap between them) so that the coupling coefficient k has a predetermined value k1. The predetermined value k1 is a design value, and hereinafter, this value k1 is also referred to as a "set coupling coefficient k1". In this example, the set coupling coefficient k1 is k1=0.8.

The driving frequency fd of the power transmission circuit 130 is set to fd=frr1 so that, when k=k1 (see the upper circuit of FIG. 2), a current Ic1 having the driving frequency fd is supplied to the power transmission resonance circuit 110, and the power transmission resonance circuit 110 and the power reception resonance circuit 210 resonate at a resonance frequency fr of fr=frr1. In this case, the input impedance Z is such an impedance Zr1 that allows the current Ic1 to flow at a constant alternating voltage applied from the power transmission circuit 130.

A state where the power reception coil 212 is not placed above the power transmission coil 112 (see the lower circuit of FIG. 2) can be considered equivalent to the state where the power reception coil 212 is placed above the power transmission coil 112 (see the upper circuit of FIG. 2) with an infinite distance between the coils, and the coupling coefficient k and the mutual inductance M are k=0 and M=0. In this state, the resonance frequency fr of the power transmission resonance circuit 110 is set to a frequency frr0 which differs from the resonance frequency frr1 at k=k1 by a predetermined deviation frequency fdv or more (see the following equation (1)) so that the power transmission resonance circuit 110 does not resonate even when a current having the driving frequency fd is supplied to the power transmission resonance circuit 110. In this case, the input impedance Z is a large impedance Zr0 (>Zr1) that allows a current Ic0 that is smaller than the current Ic1 to flow at a constant alternating voltage applied from the power transmission circuit 130. Note that the resonance frequency frr0 at k=0 is equal to the resonance frequency frn (hereinafter, also referred to as "reference resonance frequency frn") of the power transmission resonance circuit 110 alone. Therefore, the resonance frequency frr0 at k=0 is also referred to as "reference resonance frequency frn". The relationship of the following equation (1) can be interpreted that the resonance frequency frr1 at k=k1 is set at a frequency higher than the reference resonance frequency frn by the deviation frequency fdv or more (see the equation (2) below).

[Eq. 1]

[Math. 1]

$$fr = frr0 = frn \leq frr1 - fdv. \quad (1)$$

[Eq. 2]

[Math. 2]

$$frr1 \geq frn + fdv. \quad (2)$$

As will be described later, the deviation frequency fdv is set to the product of m (m>1) times the width δfrn (referred to as "half-value width") of the frequencies (see the following equation (3)) that provide half the resonance peak value at the reference resonance frequency frn of the power transmission resonance circuit 110 alone when k=0. The multiplier m is m=10 in this example. The setting of the deviation frequency fdv will be described later.

[Eq. 3]

[Math. 3]

$$fdv = m \cdot \delta frn. \quad (3)$$

The circuit constants of the power transmission resonance circuit 110 are set so that the above equations (1) and (2) are satisfied: the inductance L1 of the power transmission coil 112 is set to La and the capacitance C1 of the resonance capacitor 116 is set to Ca. The circuit constants of the power reception resonance circuit 210 are set similarly, and the inductance L2 of the power reception coil 212 is set to Lb and the capacitance C2 of the resonance capacitor 216 is set to Cb.

In the following, how the circuit constants of the power transmission resonance circuit 110 and the circuit constants of the power reception resonance circuit 210 are set so that the above equations (1) and (2) are satisfied when the coupling coefficient k has a predetermined value k1 will be described.

As shown in FIG. 3, when the power transmission resonance circuits 110 and the power reception resonance circuit 210 get close to each other, the mode of the magnetic field coupling between the resonance circuits causes resonance, and the mode of the magnetic field coupling between the resonance circuits may be the magnetic flux penetration mode (hereinafter also referred to as "first resonance mode") or the magnetic flux repulsion mode (hereinafter also referred to as "second resonance mode"). The resonance frequency frp in the first resonance mode (hereinafter also referred to as "first resonance frequency frp") is represented by the following equation (4), and the resonance frequency frr in the second resonance mode (hereinafter also referred to as "second resonance frequency frr") is represented by the following equation (5).

[Eq. 4]
[Math. 4]

$$frp = \frac{1}{2\pi\sqrt{(La+M)Ca}} = \frac{1}{2\pi\sqrt{(Lb+M)Cb}}. \quad (4)$$

[Eq. 5]
[Math. 5]

$$frr = \frac{1}{2\pi\sqrt{(La-M)Ca}} = \frac{1}{2\pi\sqrt{(Lb-M)Cb}}. \quad (5)$$

M is the mutual inductance between the inductance La of the power transmission coil 112 and the inductance Lb of the power reception coil 212, and is represented by the following equation (6).

[Eq. 6]
[Math. 6]

$$M = k\sqrt{La \cdot Lb}. \quad (6)$$

Figure 4:
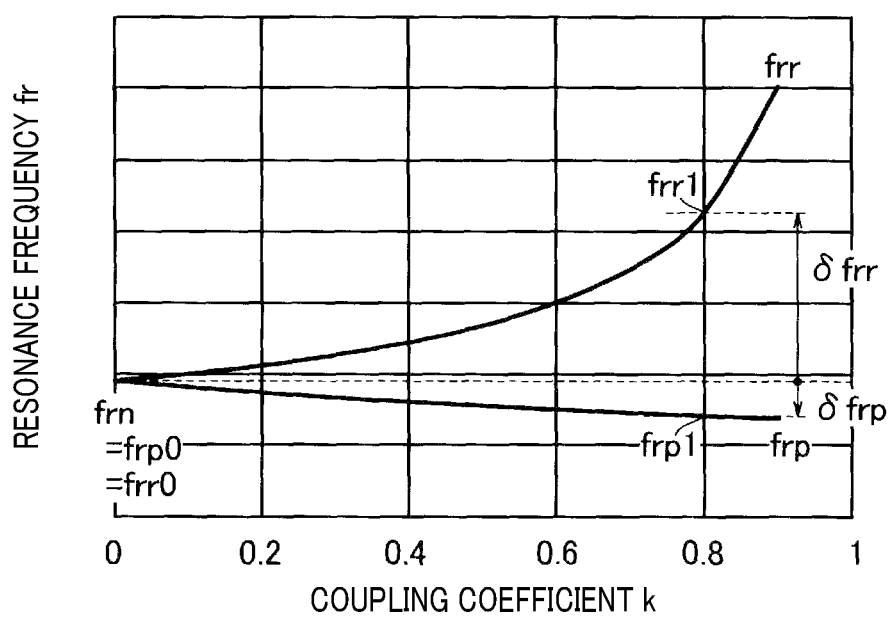
FIG. 4 is an explanatory diagram showing an example of the relationship between the coupling coefficient and the resonance frequencies of the two magnetic field coupling modes.

Since the mutual inductance M changes in proportion to the coupling coefficient k as shown in the above equation (6), the first resonance frequency frp and the second resonance frequency frr change depending on the coupling coefficient k as shown in FIG. 4. The first resonance frequency frp decreases as the coupling coefficient k increases. On the other hand, the second resonance frequency frr increases as the coupling coefficient k increases. In particular, the increment of the second resonance frequency frr increases as the coupling coefficient k increases. Note that FIG. 4 shows the resonance frequencies frp and frr of the power transmission resonance circuit 110 as examples. The values frp0 and frr0 of the resonance frequency frp at k=0 are expressed by the above equations (4) and (5) where the mutual inductance M is M=0, and they are equal to the reference resonance frequency frn of the power transmission resonance circuit 110 alone. Although not shown, the same applies to the power reception resonance circuit 210.

When the difference frr between the second resonance frequency frr (=frr1) at a coupling coefficient k of k=k1 (0.8 in this example) and the reference resonance frequency frn (=frr0) at k=0 is equal to or greater than the deviation frequency fdv described later, as will be described below, the second resonance frequency frr1 can be set as the driving frequency fd of the power transmission circuit 130 (see FIG. 2).

When it is set in such a manner, in a state where the power reception coil 212 is placed above the power transmission coil 112 and k=k1, a current Ic1 having the driving frequency fd flows through the power transmission resonance circuit 110 (see FIG. 2), and the power transmission resonance circuit 110 and the power reception resonance circuit 210 can resonate at the second resonance frequency frr1. In this case, the input impedance Z of the power transmission resonance circuit 110 is impedance Zr1 that allows the current Ic1 to flow as described above. In this case, when driven at the frequency frr1 in this coupling state, the imaginary part of the impedance becomes close to zero, and thus power can be transmitted from the power transmission resonance circuit 110 to the power reception resonance circuit 210.

On the other hand, when the power reception coil 212 is not placed above the power transmission coil 112 and k=0 and M=0, the driving frequency fd deviates (also referred to as "separate") significantly from the reference resonance frequency frn (=frr0) of the power transmission resonance circuit 110 alone by the deviation frequency fdv or more, which causes the resonance state of the power transmission resonance circuit 110 to be disrupted. In this case, since the imaginary part of the input impedance Z of the power transmission resonance circuit 110 has a large value, the impedance Zr0 is larger than the input impedance Zr1 as described above, which makes it possible to reduce the current flowing through the power transmission resonance circuit 110 to a desired current Ic0 that is smaller than the current Ic1. This prevents unnecessary power consumption in the power transmission resonance circuits 110 above which no power reception coil 212 is placed.

Therefore, when the difference frr between the second resonance frequency frr1 when the coupling coefficient k is k=k1 and the reference resonance frequency frn (=frr0) at k=0 is equal to or greater than the deviation frequency fdv described below, the second resonance frequency frr1 may be set to the driving frequency fd of the power transmission circuit 130.

The deviation frequency fdv is set at a value that can reduce the current Ic0 flowing through the power transmission resonance circuits 110 of the power transmission coils 112 above which no power reception coil 212 is placed to a predetermined value (hereinafter also referred to as "target value") or lower. Specifically, it is set by determining how far the driving frequency fd should be from the second resonance frequency frr0 at k=0, that is, the resonance frequency frn of the power transmission resonance circuit 110 alone so as to obtain a current Ic0 that is equal to or smaller than the target value.

For example, the input impedance Zr0 of the power transmission resonance circuit 110 at k=0 is represented by the following equation (7).

[Eq. 7]
[Math. 7]

$$Zr0 = \sqrt{R^2 + \left(\omega La - \frac{1}{\omega Ca}\right)^2}. \quad (7)$$

R is the load resistance component to which power is supplied.

For example, the target value of the current Ic0 is set to $1/\sqrt{101}$ of the peak current or smaller so that the current Ic0 will be equal to or smaller than $\frac{1}{10}$ of the peak current when the power transmission resonance circuit 110 is resonating at the reference resonance frequency frn. In this case, the above equation (7) can be expressed by the following equation (8a), the equation (8a) can be transformed into the following equation (8b), and the equation (8b) can be transformed into the following equation (8c). Then, when $\omega n=1/\sqrt{(La \cdot Ca)}$ and $Q=(\omega n \cdot La)/R$, the equation (8c) can be expressed by the following equation (8d). ωn is a reference resonance angular frequency corresponding to the reference resonance frequency frn of the power transmission resonance circuit 110 alone, and Q is the Q value of the load RL at the reference resonance angular frequency ωn.

[Eq. 8]

[Math. 8]

$$\sqrt{R^2 + \left(\omega La - \frac{1}{\omega Ca}\right)^2} = R\sqrt{101} \qquad (8a)$$

$$\left(\omega La - \frac{1}{\omega Ca}\right)^2 = 100R^2 \qquad (8b)$$

$$\left(\omega La - \frac{1}{\omega Ca}\right)^2 = \pm 10R^2 \qquad (8c)$$

$$\frac{\omega}{\omega n} - \frac{\omega n}{\omega} = \pm \frac{10}{Q} \qquad (8d)$$

$$\omega n = \frac{1}{\sqrt{LaCa}}, \frac{R}{\omega nLa} = \frac{1}{Q}.$$

When the equation (8d) is solved to find the solutions of the angular frequency $\omega$ at which the current Ic0 becomes equal to or smaller than $1/\sqrt{101}$ of the peak current, the angular frequency $\omega+$ on the high frequency side shown in the following equation (9a) and the angular frequency $\omega-$ on the low frequency side shown in the following equation (9b) are obtained.

[Eq. 9]

[Math. 9]

$$\omega + = \omega n \left[-\frac{10}{2Q} + \sqrt{\left(\frac{10}{2Q}\right)^2 + 1}\right] \qquad (9a)$$

$$\omega - = \omega n \left[-\frac{10}{2Q} + \sqrt{\left(\frac{10}{2Q}\right)^2 + 1}\right]. \qquad (9b)$$

The width (w+-ω−) of the angular frequencies w at which the current Ic0 is equal to or smaller than $1/\sqrt{101}$ of the peak current is represented by the following equation (10) from the above equations (9a) and (9b).

[Eq. 10]

[Math. 10]

$$\omega + -\omega - = \omega n \frac{10}{Q} = \frac{\omega n}{Q} \cdot 10. \qquad (10)$$

In the equation (10), ($\omega n/Q$) is the width of the angular frequencies (referred to as "half-value width") that provide half the peak value in the resonance characteristic where the resonance peak is obtained at the reference resonance angular frequency $\omega n$ of the power transmission resonance circuit 110. The half-value width $\delta frn$ in frequencies is represented by $\delta frn=(\omega n/Q)/2\pi$.

As can be seen from the equation (10), if the deviation of the angular frequency is equal to or greater than 10 times the half-value width ($\omega n/Q$), it is possible to make the current Ic0 equal to or smaller than $1/\sqrt{101} \approx 1/10$ of the peak value.

Therefore, if the multiplier m in the above equation (3) is set to m=10 and the deviation frequency fdv is set to 10 times the half-value width $\delta frn$, it is possible to deviate the driving frequency fd set to the second resonance frequency frr1 at k=k1 from the reference resonance frequency frn by the deviation frequency fdv that is 10 times the half-value width $\delta frn$. As a result, in a state where the power reception coil 212 is not placed above the power transmission coil 112 and k=0, the current Ic0 flowing through the power transmission resonance circuit 110 can be reduced to 1/10 or less of the peak value obtained when resonating at the reference resonance frequency frn, in other words, 1/10 or less of the current Ic1 flowing through the power transmission resonance circuit 110 when k=K1.

Therefore, the condition for making the current Ic0 that flows when the power reception coil 212 is not placed above the power transmission coil 112 1/10 or less of the peak current value obtained when resonating at the reference resonance frequency frn is as follows. That is, it is required that the multiplier m in the equation (3) is set to m=10 so that the driving frequency fd set to the second resonance frequency frr1 deviates by a deviation frequency fdv or more, the deviation frequency fdv being 10 times of the half-value width $\delta frn$ of the resonance characteristic of the reference resonance frequency frn.

Figure 5:
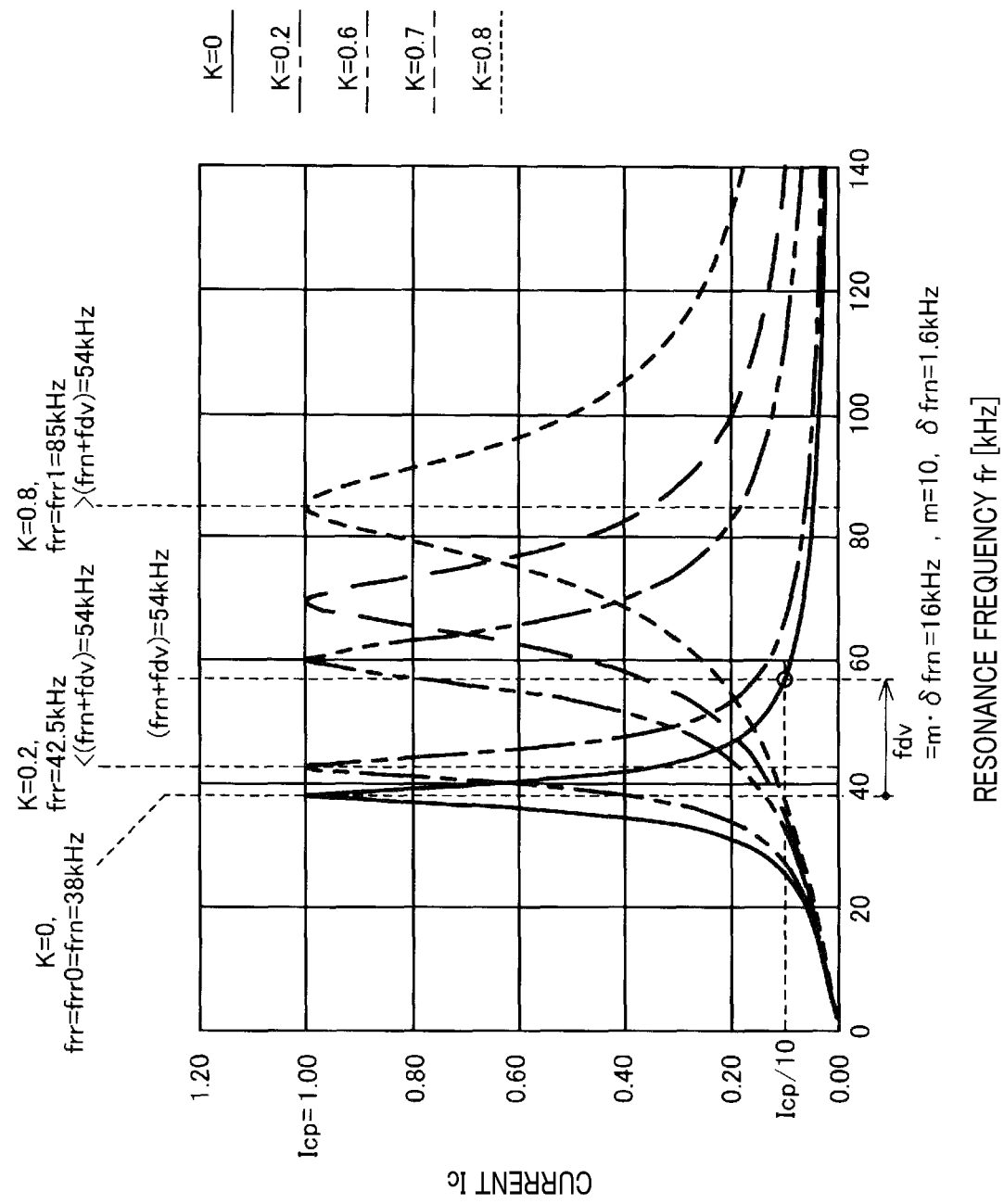
FIG. 5 is an explanatory diagram showing resonance frequencies set as the driving frequency.

For example, FIG. 5 shows example resonance characteristics of the second resonance frequency frr where k=0, 0.2, 0.6, 0.7, and 0.8. In FIG. 5, the current Ic is represented by its ratio to the peak value Icp. Further, FIG. 5 shows an example where k=0.8 is the predetermined value k1, and the circuit constants of the power transmission resonance circuit 110 and the power reception resonance circuit 210 (see FIG. 2) are set so that the second resonance frequency frr1 becomes 85 kHz when k=0.8 is the predetermined value k1. The second resonance frequency frr0 at k=0 is 38 kHz. Note that this second resonance frequency frr0 is equal to the resonance frequency frn of the power transmission resonance circuit 110 alone as described earlier. The half-value width $\delta frn$ is $\delta frn=1.6$ kHz and the multiplier m is m=10. The deviation frequency fdv in this case is fdv=16 kHz according to the equation (3). Therefore, the condition for a second resonance frequency frr to be able to be set as the driving frequency fd is frr>=(frn+fdv)=54 kHz.

The second resonance frequency frr at k=0.2 is 42.5 kHz. This second resonance frequency frr is lower than (frn+fdv) =54 kHz. Therefore, even if the driving frequency fd is set to frr=42.5 kHz, the driving frequency fd cannot be deviated from the reference resonance frequency frn by the deviation frequency fdv or more. Therefore, the current Ic0 in a state where k=0 cannot be reduced to 1/10 or less of the peak value.

On the other hand, when k=k1=0.8, the second resonance frequency frr is frr1=85 kHz, which is higher than (frn+fdv) =54 kHz. Therefore, if the driving frequency fd is set to frr=85 kHz, the driving frequency fd can be separated from the reference resonance frequency frn by the deviation frequency fdv or more. Therefore, the current Ic0 in a state where k=0 can be reduced to 1/10 or less of the peak value.

As described above, the driving frequency fd of the power transmission circuit 130 is set to the second resonance frequency frr1 generated in the power transmission resonance circuit 110 and the power reception resonance circuit 210 in a state where the coupling coefficient k has a predetermined value k1. The second resonance frequency frr1 is a frequency that is deviated from the second resonance frequency frr0 in a state where k=0, that is, the reference resonance frequency frn of the power transmission resonance circuit 110 alone by a predetermined deviation frequency fdv or more. The deviation frequency fdv is a frequency difference that enables making the current Ic0 that flows when the power reception coil 212 is not placed above the power transmission coil 112 1/10 or less of the peak resonance current value obtained when resonating at the reference resonance frequency frn. As a result, the power transmission resonance circuit 110 does not resonate at the driving frequency fd when the power reception coil 212 is not placed above the power transmission coil 112, and the current Ic0 that flows through the power transmission circuit 110 can be reduced to 1/10 or less of the peak current value obtained when resonating at the reference resonance frequency frn. This prevents unnecessary power consumption in the power transmission resonance circuit 110 in a state where the power reception coil 212 is not placed above the power transmission coil 112 and k=0 and M=0. On the other hand, in a state where the power reception coil 212 is placed above the power transmission coil 112 and k=k1, it is possible to transmit power from the power transmission resonance circuit 110 to the power reception resonance circuit 210.

In the above description, the multiplier m for making the current Ic0 1/10 or less of the peak value is set at m=10 so that the deviation frequency fdv is 10 times the half-value width δfrn. However, the multiplier is not limited to this. The multiplier m can be changed as appropriate depending on how much the current Ic0 should be reduced with respect to the peak value. The value of the multiplier m in this case can be determined by a process similar to that described above. In addition, the deviation frequency fdv is not limited to m times the half-value width δfrn. In short, it can be set in any way as long as it can be set to a value at which the current Ic0 can be reduced to a target current value determined in advance with respect to the peak value.

An example case where the second resonance frequency frr is set as the driving frequency fd has been described above. Meanwhile, as shown in FIG. 4, the first resonance frequency also has such a characteristic that it decreases as the coupling coefficient k increases. Therefore, the first resonance frequency frp may be set as the driving frequency fd like the second resonance frequency frr. In this case as well, the condition is that the first resonance frequency frp where k=k1, that is, the first resonance frequency frp1 is lower than the reference resonance frequency frn by the deviation frequency fdv or more. This makes it possible to suppress the driving frequency fd to a low value and reduce the loss caused in the power transmission circuit 130.

Further, when the first resonance frequency frp is set as the driving frequency fd, it is preferable to set the second resonance frequency frr to be three times the frequency of the first resonance frequency frp. Since power can also be transmitted by the resonance at the frequency of the third harmonic of the driving frequency fd, the efficiency of power transfer can be improved.

The deviation of the resonance frequency frn of the power transmission resonance circuit 110 alone from the driving frequency fd and can be increased when the second resonance frequency frr is used as the driving frequency fd, and therefore, the effect of reducing the power flowing through power transmission coils 112 above which no power reception coil 212 is placed can be improved. In addition, since they operate in the magnetic flux repulsion mode, the effect of reducing magnetic field leakage can be enhanced by the magnetic field canceling effect.

The operating state of the power transmission circuit 130 of the power supplying device 100 is preferably controlled by repeating the control process shown in FIG. 6 by the control circuit 150.

When the control circuit 150 starts this control process, it first determines whether there is a power receiving device 200 near the power supplying device 100 (step S110). For example, this can be carried out by determining whether wireless communication between the power supplying device 100 and the power receiving device 200 can be established, or whether a camera or the like has determined that a power receiving device has approached. It can also be carried out by detecting whether there is a power receiving device 200 within a certain range using a sensor.

When there is no power receiving device 200 near the power supplying device 100 (step S110: NO), the control circuit 150 terminates this process. On the other hand, when there is a power receiving device 200 near the power supplying device 100 (step S110: YES), the control circuit 150 starts operating the power transmission circuit 130 (step S120), and the operation of the power transmission circuit 130 is continued until there is no power receiving device 200 near the power supplying device 100 (step S130: YES) (step S120). When there is no longer a power receiving device 200 near the power supplying device 100 (step S130: NO), the control circuit 150 stops the operation of the power transmission circuit 130 (step S140) and ends the process. The determination of step S130 is made similarly to step S110.

As described above, by controlling the operating state of the power transmission circuit 130 by the control circuit 150 of the power supplying device 100, it is possible to rapidly control the start and stop of power supply between the power supplying device 100 and the power receiving device 200. In addition, unnecessary power consumption in each power supplying device 100 can be prevented.

The power transmission coil 112 and the power reception coil 212 described above are typically coils having a structure in which wiring is wound around the core. However, the present invention is not limited to this, and as shown in FIG. 7, whereas the power transmission coil 112 has a structure with a core 310 around which wiring 312 is wound in a loop shape, the power reception coil is preferably a power reception coil 212A having a coreless structure in which the wiring 322 forms a loop instead of the power reception coil 212 having a core. In this way, it is possible to suppress an increase in the self-inductance of the power transmission coil 112 caused by the coupling between the power reception coil 212A and the power transmission coil 112. This enhances the effect of deviating the second resonance frequency frr from the reference resonance frequency frn.

Figure 8:
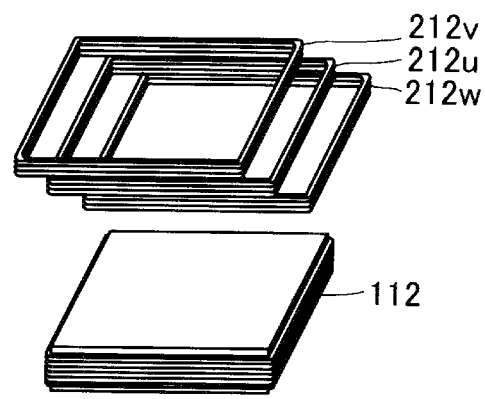
FIG. 8 is an explanatory diagram showing other examples of the structures of the power transmission coil and the power reception coil.

Further, as shown in FIG. 8, the power reception coil may have a configuration in which three-phase power reception coil windings 212*u*, 212*v*, 212*w* are stacked. The present invention is not limited to three-phase power reception coils, and two or more multi-phase power reception coil windings may be stacked. With this configuration, power can be sequentially transmitted by resonance between the power transmission coil 112 and the coil winding of the multi-phase power reception coil windings that provides strong coupling with the power transmission coil, which enhances the power transfer efficiency.

B. Second Embodiment

Figure 9:
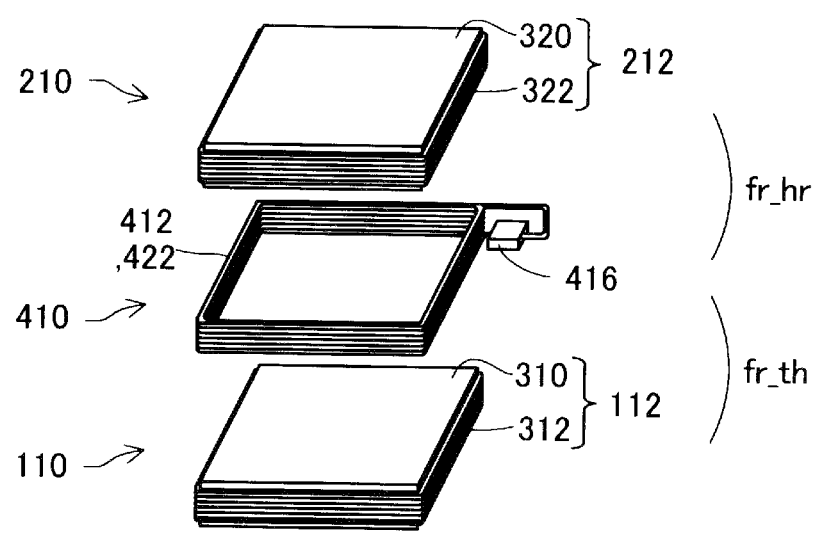
FIG. 9 is an explanatory diagram showing a configuration including one relay resonance circuit as the second embodiment.

As shown in FIG. 9, a relay coil 412 may be arranged between the power transmission coil 112 of the power transmission resonance circuit 110 and the power reception coil 212 of the power reception resonance circuit 210. As with the power transmission coil 112, the power reception coil 212 is a coil with a core 320 around which wiring 322 is wound in a loop shape. The relay coil 412 has a coreless structure in which the wiring 422 forms a loop. Alternatively, the relay coil may have a core. A resonance capacitor 416 for relay resonance is connected to the relay coil 412. The relay coil 412 and the resonance capacitor 416 form a relay resonance circuit 410. The relay resonance circuit 410 is a closed-loop resonance circuit that resonates at the driving frequency. Alternatively, it may resonate at the driving frequency using the stray capacitance between the coil wires as the resonance capacitor.

The parameters (inductance, capacitance) of the resonance circuits 110, 410, 210 are set so that the resonance frequency fr_th between the power transmission resonance circuit 110 and the relay resonance circuit 410 and the resonance frequency fr_hr between the relay resonance circuit 410 and the power reception resonance circuit 210 have the frequencies described below.

Figure 10:
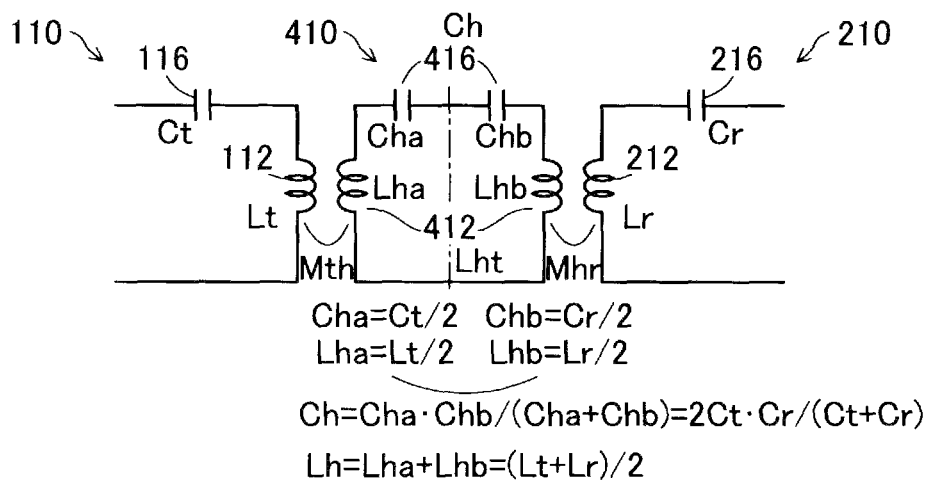
FIG. 10 is a circuit diagram corresponding to the configuration of FIG. 9.

Considering the function of the relay resonance circuit 410, the relay coil 412 and the resonance capacitor 416 can be virtually divided into a coil and a capacitor on the power transmission side and a coil and a capacitor on the power reception side, and the power transmission resonance circuit 110, the relay resonance circuit 410, and the power reception resonance circuit 210 can be represented by the circuit shown in FIG. 10. Let the inductances of the power transmission coil 112, the relay coil 412, and the power reception coil 212 be Lt, Lh, and Lr, and the capacitances of the resonance capacitor 116 for power transmission resonance, the resonance capacitor 416 for relay resonance, and the resonance capacitor 216 for power reception resonance be Ct, Ch, and Cr. Further, let the mutual inductance between the power transmission coil 112 and the relay coil 412 be Mth, and the mutual inductance between the relay coil 412 and the power reception coil 212 be Mhr. Furthermore, let the power transmission side part of the inductance Lh of the relay coil 412 be Lha and the power reception side part of the inductance Lh of the relay coil 412 be Lhb, and the power transmission side part of the capacitance Ch of the resonance capacitor 416 for relay resonance be Cha and the power reception side part of the capacitance Ch of the resonance capacitor 416 for relay resonance be Chb.

Since the power transmission side part of the relay resonance circuit 410 resonates at the same frequency as the power transmission resonance circuit 110, the inductance Lha and capacitance Cha of the power transmission side part can be expressed as Lha=Lt/2 and Cha=2Ct using the inductance Lt of the power transmission coil 112 and the capacitance Ct of the resonance capacitor 116 for power transmission resonance. Likewise, since the power reception side part of the relay resonance circuit 410 resonates at the same frequency as the power reception resonance circuit 210, the inductance Lhb and capacitance Chb of the power reception side part can be expressed as Lhb=Lr/2 and Chb=2Cr using the inductance Lr of the power reception coil 212 and the capacitance Cr of the resonance capacitor 216 for power reception resonance. The inductance Lh of the relay coil 412 can be expressed as Lh=(Lha+Lhb)=(Lt+Lr)/2. The capacitance Ch of the resonance capacitor 416 for relay resonance can be expressed as Ch=[Cha·Chb/(Cha+Chb)]=[2Ct·Cr/(Ct+Cr)].

Figure 11:
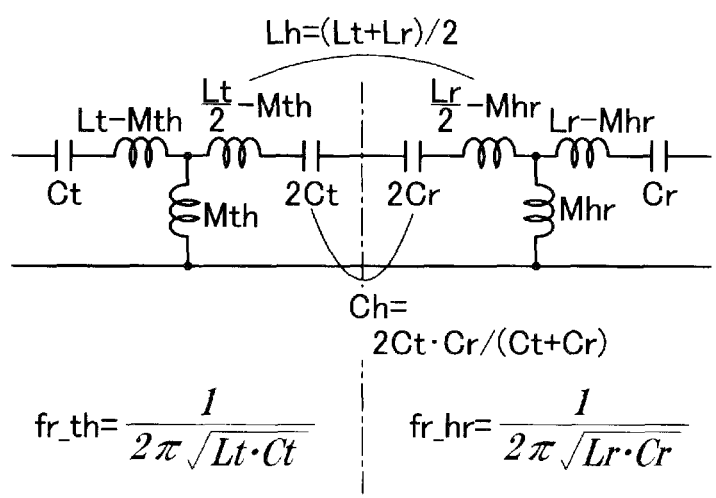
FIG. 11 is an equivalent circuit diagram of the circuit of FIG. 10.

The circuit shown in FIG. 10 can be represented by the equivalent circuit shown in FIG. 11. The left side of the alternate long and short dash line shows an equivalent circuit of the resonance part (also referred to as "power transmission side resonance part") formed by the power transmission resonance circuit 110 and the virtually divided power transmission side part of the relay resonance circuit 410, and the right side of the alternate long and short dash line shows an equivalent circuit of the resonance part (also referred to as "power reception side resonance part") formed by the virtually divided power reception side part of the relay resonance circuit 410 and the power reception resonance circuit 210.

The parameters of the equivalent circuit of the power transmission side resonance part can be expressed as shown in FIG. 11 using the inductance Lt of the power transmission coil 112, the capacitance Ct of the resonance capacitor 116, and the mutual inductance Mth between the power transmission coil 112 and the relay coil 412. The parameters of the equivalent circuit of the power reception resonance circuit can be expressed as shown in FIG. 11 using the inductance Lr of the power reception coil 212, the capacitance Cr of the resonance capacitor 216, and the mutual inductance Mhr between the power reception coil 212 and the relay coil 412.

The resonance frequency (hereinafter also referred to as "power transmission side resonance frequency") fr_th of the power transmission side resonance part can be represented by the following equation (11) using the inductance Lt of the power transmission coil 112 and the capacitance Ct of the resonance capacitor 116. The resonance frequency (hereinafter also referred to as "power reception side resonance frequency") fr_hr of the power reception side resonance part can be represented by the following equation (12) using the inductance Lr of the power reception coil 212 and the capacitance Cr of the resonance capacitor 216.

[Eq. 11]

[Math. 11]

$$fr\_th = \frac{1}{2\pi\sqrt{Lt \cdot Ct}}. \quad (11)$$

[Eq. 12]

[Math. 12]

$$fr\_hr = \frac{1}{2\pi\sqrt{Lr \cdot Cr}}. \quad (12)$$

In the following, let the inductance and capacitance of when the resonance frequency of a resonance circuit alone composed of an inductance and a capacitance is the reference resonance frequency frn described in connection with the first embodiment be Ln and Cn, and the inductance and capacitance of when the resonance frequency is the second resonance frequency frr described in connection with the first embodiment be Lu and Cu. The reference resonance frequency frn is represented by the following equation (13) and the second resonance frequency frr is represented by the following equation (14).

[Eq. 13]

[Math. 13]

$$frn = \frac{1}{2\pi\sqrt{Ln \cdot Cn}}. \quad (13)$$

[Eq. 14]

[Math. 14]

$$frr = \frac{1}{2\pi\sqrt{Lu \cdot Cu}}. \quad (14)$$

Figure 12:
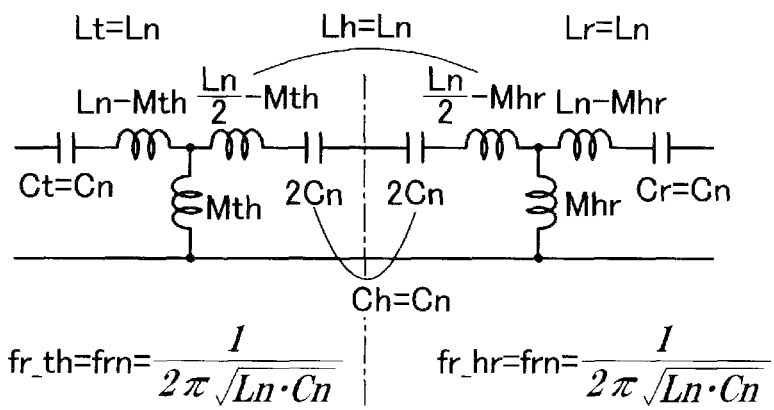
FIG. 12 is an equivalent circuit diagram where the power transmission side resonance frequency and the power reception side resonance frequency are the reference resonance frequency.
Figure 13:
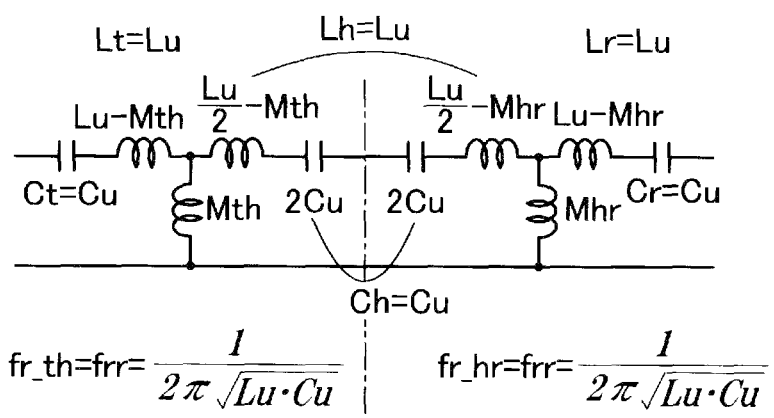
FIG. 13 is an equivalent circuit diagram where the power transmission side resonance frequency and the power reception side resonance frequency are the second resonance frequency.

When the power transmission side resonance frequency fr_th and the power reception side resonance frequency fr_hr are the reference resonance frequency frn and set to be equal to the driving frequency fd, the equivalent circuit of FIG. 11 can be represented as shown in FIG. 12 where Lt=Lr=Ln and Ct=Cr=Cn. When the power transmission side resonance frequency fr_th and the power reception side resonance frequency fr_hr are the second resonance frequency frr and set to be equal to the driving frequency fd, the equivalent circuit of FIG. 11 can be represented as shown in FIG. 13 where Lt=Lr=Lu and Ct=Cr=Cu. Note that Lu and Cu are parameters that resonate at a coupling coefficient obtained when two coils for transmitting and receiving power come close to each other and are at predetermined relative positions as described in connection with the first embodiment. They are equivalent to the parameters set in the system that resonates with respect to Ln−M or Ln+M.

Figure 14:
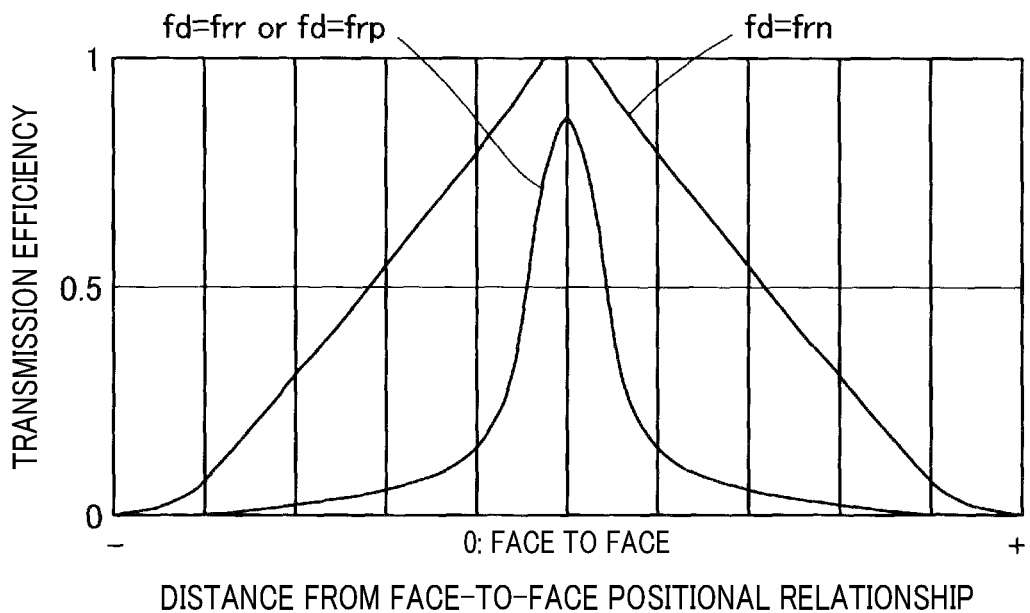
FIG. 14 is an explanatory diagram showing the relationship between the set resonance frequency and the transmission efficiency.

FIG. 14 shows the transmission efficiency of a system not including a relay resonance circuit like the first embodiment in the case where the resonance frequency between the power transmission resonance circuit and the power reception resonance circuit, which is set to be equal to the driving frequency fd, is the first resonance frequency fdp or the second resonance frequency frr, and the transmission efficiency of the system in the case where the resonance frequency is the reference resonance frequency frn. The transmission efficiency values in FIG. 14 are relative values obtained using the transmission efficiency of when fd=frn as the reference value 1.

The transmission efficiency of when fd=frn gradually decreases as the positional relationship between the coils of the power transmission circuit and the power reception resonance circuit deviates from the positional relationship where they are facing each other. On the other hand, when fd=frr or fd=frp, although the peak value of the transmission efficiency is slightly lower than that of fd=frn, it decreases abruptly once the positional relationship between the coils deviates from that of when they are facing each other. Therefore, when fd=frr or fd=frp, it is possible to rapidly switch between start and stop of power transmission according to the positional relationship between the coils of the power transmission resonance circuit and the power reception resonance circuit. This improves the performance of cutting off the power transmission resonance circuits that do not transmit power.

As shown in FIG. 12, when both the power transmission side resonance frequency fr_th and the power reception side resonance frequency fr_hr are the reference resonance frequency frn and the driving frequency fd is set at the reference resonance frequency frn, power can be transmitted efficiently, but the switching between start and stop of transmission is gradual, and it is difficult to realize abrupt switching. In contrast, as shown in FIG. 13, when both the power transmission side resonance frequency fr_th and the power reception side resonance frequency fr_hr are the second resonance frequency frr and the driving frequency fd is set to the second resonance frequency frr, it is possible to abruptly switch between start and stop of transmission. However, in this case, since power transmission by resonance with a slightly low efficiency is performed in two stages, the power transmission efficiency is not as good as that of single-stage transmission.

Figure 15:
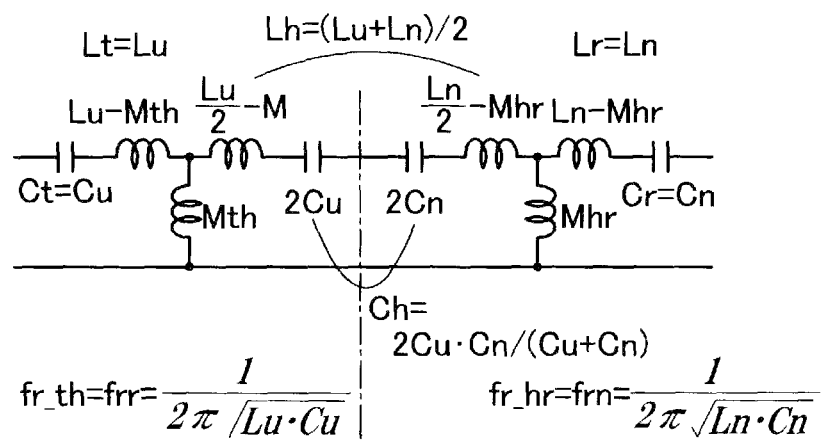
FIG. 15 is an equivalent circuit diagram where the power transmission side resonance frequency is the second resonance frequency and the power reception side resonance frequency is the reference resonance frequency.

To suppress the decrease in power transmission efficiency in the case of the configuration shown in FIG. 13, as shown in FIG. 15, the power transmission side resonance frequency fr_th may be the second resonance frequency frr, the power reception side resonance frequency fr_hr may be the reference resonance frequency frn, and the driving frequency fd may be set to the second resonance frequency frr. With this configuration, it is possible to abruptly switch between start and stop of transmission in the power transmission side resonance part, and suppress the decrease in transmission efficiency in the power reception side resonance part. Thus, it is possible to abruptly switch between start and stop of transmission while suppressing the decrease in transmission efficiency as compared with the case where both the power transmission side resonance frequency fr_th and the power reception side resonance frequency fr_hr are the second resonance frequency frr (see FIG. 13).

When the power transmission side resonance frequency fr_th is to be the second resonance frequency frr and the power reception side resonance frequency fr_hr is to be the reference resonance frequency frn, the parameters of the equivalent circuit may be set as shown in FIG. 15. That is, they may be set such that Lt=Lu and Ct=Cu, Lr=Ln and Cr=Cn, and Lh=(Lu+Ln)/2 and Ch=[2Cu·Cn/(Cu+Cn)]. In this case, the value of the inductance of the relay coil 412 of the relay resonance circuit 410 of FIG. 9 is Lh, and the value of the resonance capacitor is Ch.

Although not illustrated nor described, the power transmission side resonance frequency fr_th may be the reference resonance frequency frn and the power reception side resonance frequency fr_hr may be the second resonance frequency frr. In this case, the parameters of the resonance circuits may be set such that Lt=Ln and Ct=Cn, Lr=Lu and Cr=Cu, and Lh=(Lu+Ln)/2 and Ch=[2Cu·Cn/(Cu+Cn)]. In this case as well, it is possible to abruptly switch between start and stop of transmission while suppressing the decrease in transmission efficiency.

Note that, in the above description, the second resonance frequency frr is used as an example, but the same applies when the second resonance frequency frr is replaced with the first resonance frequency frp. In this case, the corresponding parameters of the equivalent circuit can be set by using the inductance and capacitance of when the resonance frequency of a resonance circuit alone composed of an inductance and a capacitance becomes the first resonance frequency frp.

C. Third Embodiment

Figure 16:
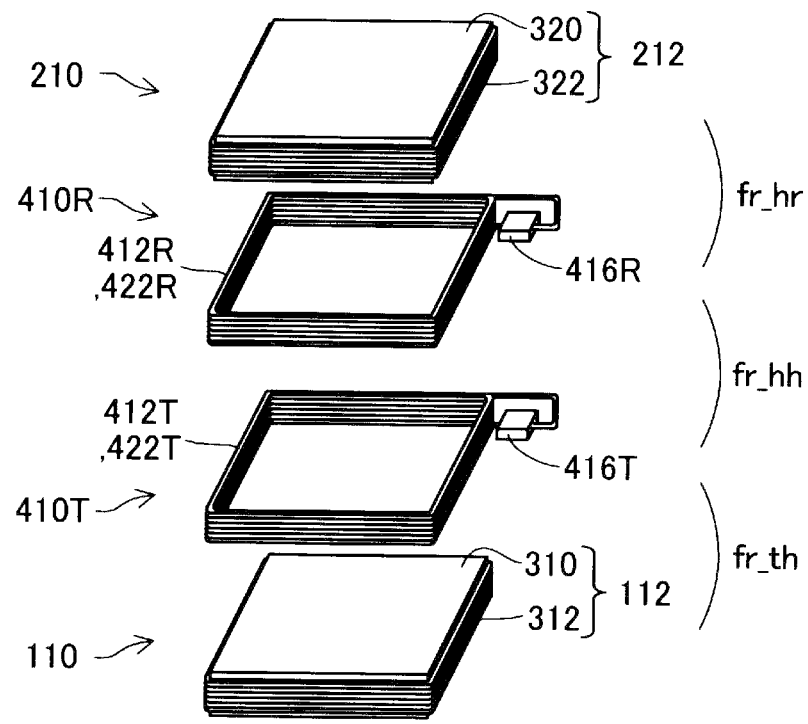
FIG. 16 is an explanatory diagram showing a configuration including two relay resonance circuits as the third embodiment.

As shown in FIG. 16, between the power transmission coil 112 of the power transmission resonance circuit 110 and the power reception coil 212 of the power reception resonance circuit 210, a relay coil 412T on the power transmission side facing the power transmission coil 112 and a relay coil 412R on the power reception side facing the power reception coil 212 may be provided. The relay coil 412T has a coreless structure in which the wiring 422T forms a loop, and the relay coil 412R has a coreless structure in which the wiring 422R forms a loop. Alternatively, the relay coils may have cores. A resonance capacitor 416T for relay resonance is connected to the relay coil 412T on the power transmission side, and a resonance capacitor 416R for relay resonance is connected to the relay coil 412R on the power reception side. The relay coil 412T and the resonance capacitor 416T on the power transmission side form a relay resonance circuit 410T on the power transmission side, and the relay coil 412R and the resonance capacitor 416R on the power reception side form a relay resonance circuit 410R on the power reception side. The relay resonance circuit 410T on the power transmission side and the relay resonance circuit 410R on the power reception side are closed-loop resonance circuits that resonate at the driving frequency. Alternatively, they may resonate at the driving frequency using the stray capacitance between the coil wires as the resonance capacitor.

The parameters of the resonance circuits 110, 410T, 410R, 210 are set so that the resonance frequencies fr_th, fr_hh, fr_hr between the resonance circuits have the frequencies described below. The power transmission side resonance frequency fr_th is the resonance frequency between the power transmission resonance circuit 110 and the relay resonance circuit 410T on the power transmission side. The power reception side resonance frequency fr_hr is the resonance frequency between the relay resonance circuit 410R on the power reception side and the power reception resonance circuit 210. The relay side resonance frequency fr_hh is the resonance frequency between the relay resonance circuit 410T on the power transmission side and the relay resonance circuit 410R on the power reception side.

Figure 17:
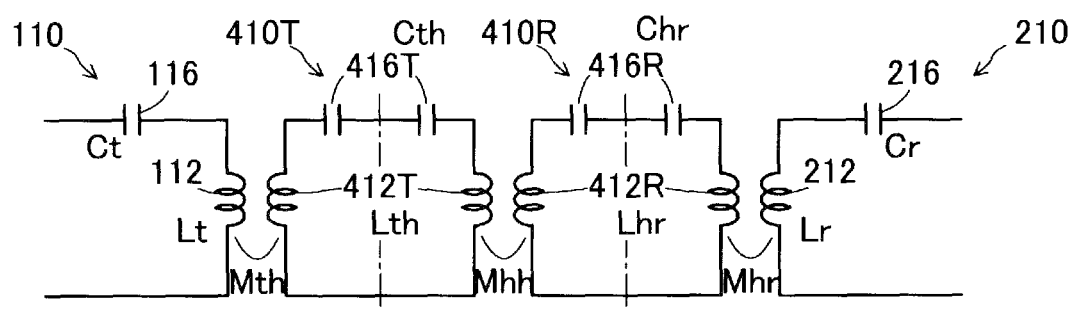
FIG. 17 is a circuit diagram corresponding to the configuration of FIG. 16.

The power transmission resonance circuit 110, the relay resonance circuit 410T on the power transmission side, the relay resonance circuit 410R on the power reception side, and the power reception resonance circuit 210 can be represented by the circuit shown in FIG. 17 by virtually separating the relay resonance circuit 410T on the power transmission side and the relay resonance circuit 410R on the power reception side as in the second embodiment. Let the inductances of the power transmission coil 112, the relay coil 412T on the power transmission side, the relay coil 412R on the power reception side, and the power reception coil 212 be Lt, Lth, Lhr, and Lr. Further, let the capacitances of the resonance capacitor 116 for power transmission resonance, the resonance capacitor 416T for power transmission side relay resonance, the resonance capacitor 416R for power reception side relay resonance, and the resonance capacitor 216 for power reception resonance be Ct, Cth, Chr, and Cr. Furthermore, let the mutual inductance between the power transmission coil 112 and the relay coil 412 be Mth, the mutual inductance between the relay coil 412T on the power transmission side and the relay coil 412R on the power reception side be Mhh, and the mutual inductance between the relay coil 412R on the power reception side and the power reception coil 212 be Mhr.

Figure 18:
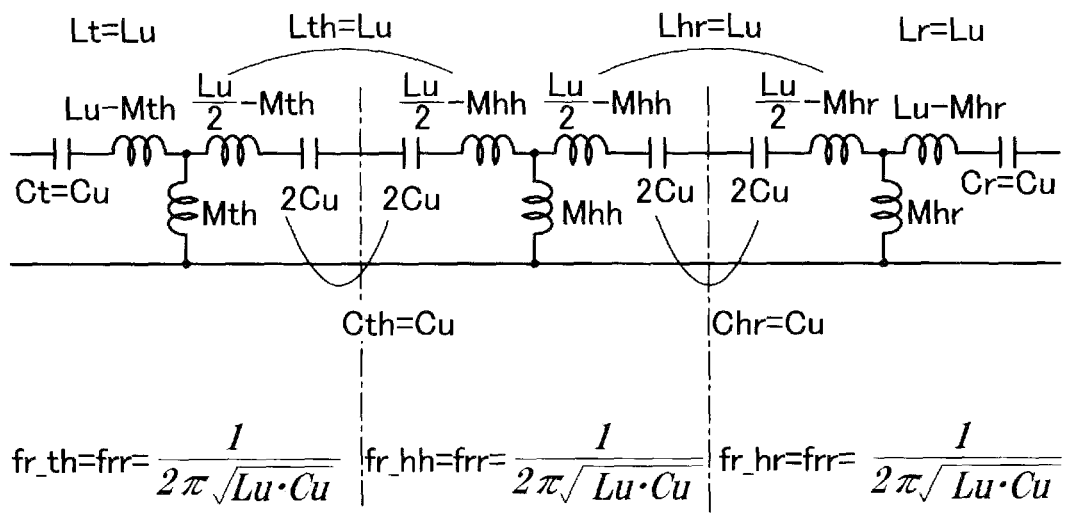
FIG. 18 is an equivalent circuit diagram where the resonance frequencies of the circuit shown in FIG. 17 are all the second resonance frequency.

The circuitry shown in FIG. 17 can be represented by the equivalent circuitry shown in FIG. 18. Of the equivalent circuits divided by two alternate long and short dash lines, the one on the left represents the equivalent circuit of a resonance part (also referred to as "power transmission side resonance part") composed of the power transmission resonance circuit 110 and the virtually divided power transmission side part of the relay resonance circuit 410T on the power transmission side. The one on the right represents the equivalent circuit of a resonance part (also referred to as "power reception side resonance part") composed of the virtually divided power reception side part of the relay resonance circuit 410R on the power reception side and the power reception resonance circuit 210. The equivalent circuit at the center represents the equivalent circuit of a resonance part (also referred to as "relay side resonance part") composed of the virtually divided power reception side part of the relay resonance circuit 410T on the power transmission side and the virtually divided power transmission side part of the relay resonance circuit 410R on the power reception side. In this case, the parameters of the resonance circuits are set so that Lt=Lth=Lhr=Lr=Lu and Ct=Cth=Chr=Cr=Cu, and the power transmission side resonance frequency fr_th of the power transmission side resonance part, the relay side resonance frequency fr_hh of the relay side resonance part, and the power reception side resonance frequency fr_hr of the power reception side resonance part are all the second resonance frequency frr.

As shown in FIG. 18, when all the power transmission side resonance frequency fr_th, the relay side resonance frequency fr_hh, and the power reception side resonance frequency fr_hr are the second resonance frequency frr, and the driving frequency fd is set to the second resonance frequency frr, as with the case of the second embodiment described with reference to FIG. 13, it is possible to abruptly switch between start and stop of transmission, although the power transmission efficiency deteriorates. In the case of the configuration of the third embodiment, since the power is transmitted by three-stage resonance, the transmission efficiency is even more deteriorated than that of the two-stage configuration shown in FIG. 13.

Figure 19:
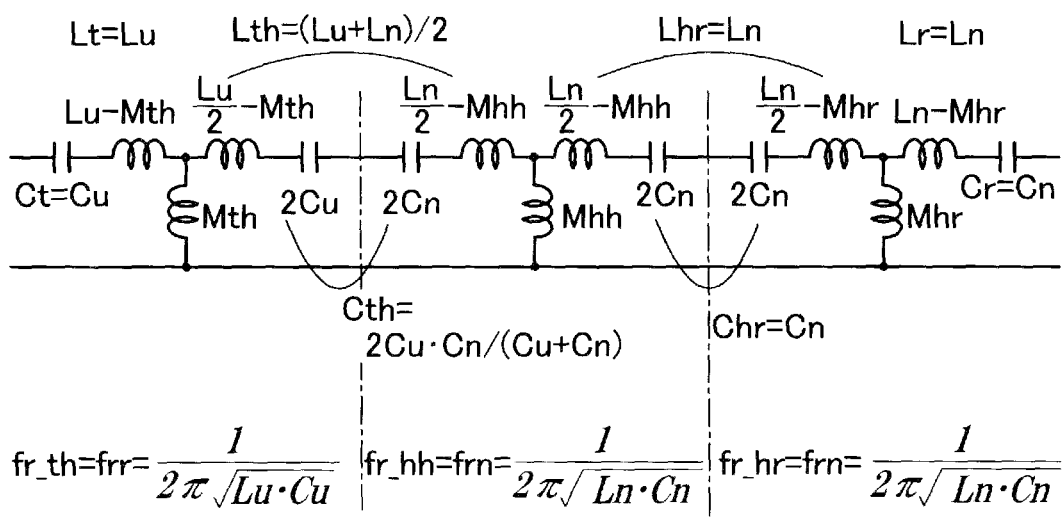
FIG. 19 is an equivalent circuit diagram where the power transmission side resonance frequency is the second resonance frequency, and the relay side resonance frequency and the power reception side resonance frequency are the reference resonance frequency.

To suppress the decrease in power transmission efficiency in the case of the configuration shown in FIG. 18, as shown in FIG. 19, the power transmission side resonance frequency fr_th may be the second resonance frequency frr, and the relay side resonance frequency fr_hh and the power reception side resonance frequency fr_hr may be the reference resonance frequency frn, and the driving frequency fd may be set to the second resonance frequency frr. With this configuration, it is possible to abruptly switch between start and stop of transmission in the power transmission side resonance part while suppressing the decrease in transmission efficiency in the relay side resonance part and the power reception side resonance part. Therefore, it is possible to abruptly switch between start and stop of transmission while suppressing the decrease in transmission efficiency as compared with the case where all the power transmission side resonance frequency fr_th, the relay side resonance frequency fr_hh, and the power reception side resonance frequency fr_hr are the second resonance frequency frr (see FIG. 18).

When the power transmission side resonance frequency fr_th is to be the second resonance frequency frr, and the relay side resonance frequency fr_hh and the power reception side resonance frequency fr_hr are to be the reference resonance frequency frn, the parameters of the resonance circuits may be set as shown in FIG. 19. That is, they may be set such that Lt=Lu and Ct=Cu, Lth=(Lu+Ln)/2 and Cth=[2Cu·Cn/(Cu+Cn)], Lhr=Ln and Chr=Cn, and Lr=Ln and Cr=Cn.

Figure 20:
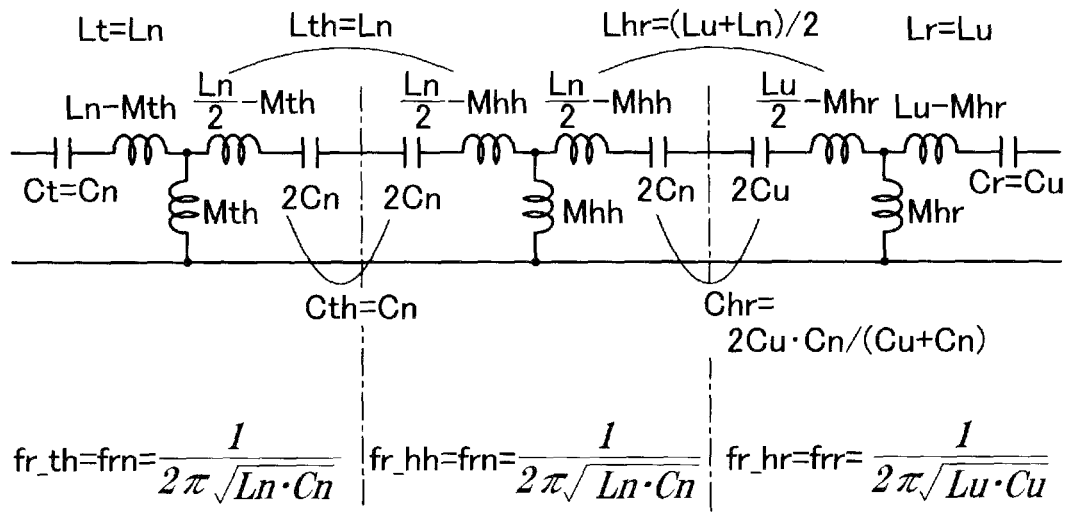
FIG. 20 is an equivalent circuit diagram where the power reception side resonance frequency is the second resonance frequency, and the power transmission side resonance frequency and the relay side resonance frequency are the reference resonance frequency.
Figure 21:
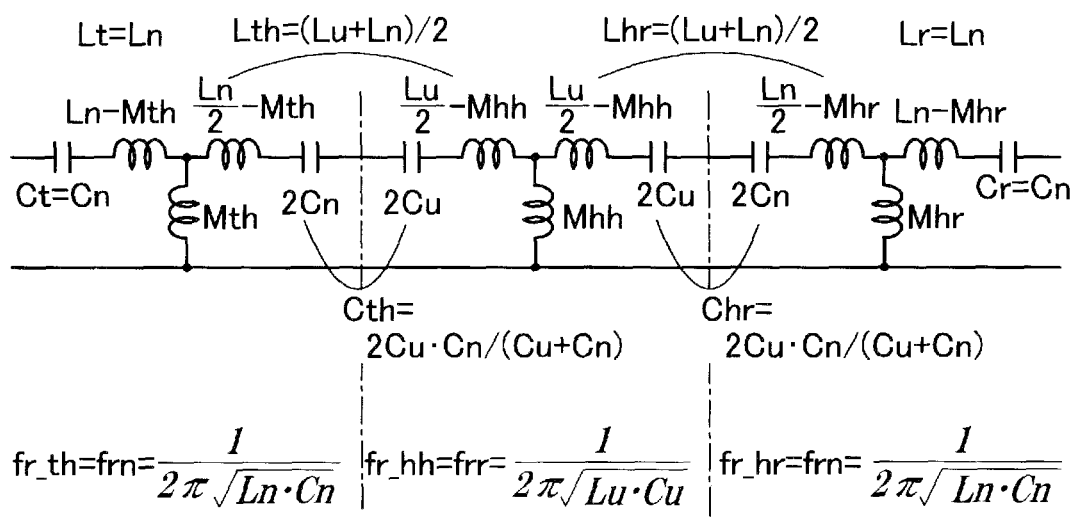
FIG. 21 is an equivalent circuit diagram where the relay side resonance frequency is the second resonance frequency, and the power transmission side resonance frequency and the power reception side resonance frequency is the reference resonance frequency.

FIG. 19 shows a case where the power transmission side resonance frequency fr_th is the second resonance frequency frr, but the power reception side resonance frequency fr_hr may be the second resonance frequency frr as shown in FIG. 20. In this case, the parameters of the resonance circuits may be set such that Lt=Ln and Ct=Cn, Lth=Ln and Cth=Cn, Lhr=(Lu+Ln)/2 and Chr=[2Cu·Cn/(Cu+Cn)], and Lr=Ln and Cr=Cn as shown in FIG. 20. Further, as shown in FIG. 21, the relay side resonance frequency fr_hh may be the second resonance frequency frr. In this case, the parameters of the resonance circuits may be set such that Lt=Ln and Ct=Cn, Lth=(Lu+Ln)/2 and Cth=[2Cu·Cn/(Cu+Cn)], Lhr=(Lu+Ln)/2 and Chr=[2Cu·Cn/(Cu+Cn)], and Lr=Ln and Cr=Cn as shown in FIG. 21. In this case as well, it is possible to abruptly switch between start and stop of transmission while suppressing the decrease in transmission efficiency.

Note that, in the above description, the second resonance frequency frr is used as an example, but the same applies even if the second resonance frequency frr is replaced with the first resonance frequency frp. In this case, the corresponding parameters of the equivalent circuit can be set by using the inductance and capacitance of when the resonance frequency of a resonance circuit alone composed of an inductance and a capacitance becomes the first resonance frequency frp.

D. Fourth Embodiment

Figure 22:
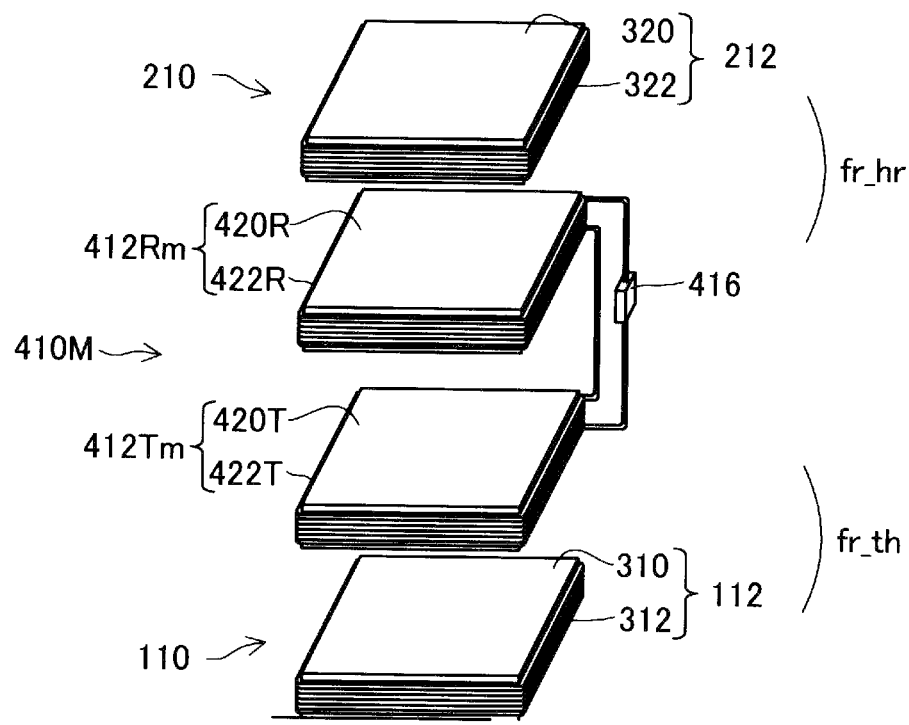
FIG. 22 is an explanatory diagram showing a configuration including a relay resonance circuit with two relay coils as the fourth embodiment.

As shown in FIG. 22, the first end of the relay coil 412Tm on the power transmission side and the first end of the relay coil 412Rm on the power reception side may be electrically connected to each other, and their second ends may be connected via the capacitor 416 for relay resonance. The difference between the present embodiment and the third embodiment is that in the present embodiment, there is a distance between the relay coil 412Tm on the power transmission side and the relay coil 412Rm on the power reception side that is large enough to prevent the magnetic flux generated by one coil from linking with the other. As with the power transmission coil 112, the relay coil 412Tm is a coil with a core 420T, around which wiring 422T is wound in a loop shape, and the relay coil 412Rm is a coil with a core 420R around which wiring 422R is wound in a loop shape. Alternatively, the relay coils may be coreless coils. The relay coils 412Tm, 412Rm and the resonance capacitor 416 for relay resonance constitute a relay resonance circuit 410M that functions in the same manner as the relay resonance circuit 410 of the second embodiment (see FIG. 10).

The parameters of the resonance circuits 110, 410M, 210 are set so that the resonance frequencies fr_th, fr_hr between the resonance circuits have the frequencies described below. The power transmission side resonance frequency fr_th is the resonance frequency between the power transmission resonance circuit 110 and the resonance part of the relay resonance circuit 410M formed by the relay coil 412Tm on the power transmission side. The power reception side resonance frequency fr_hr is the resonance frequency between the resonance part of the relay resonance circuit 410M formed by the relay coil 412Rm on the power reception side and the power reception resonance circuit 210.

Figure 23:
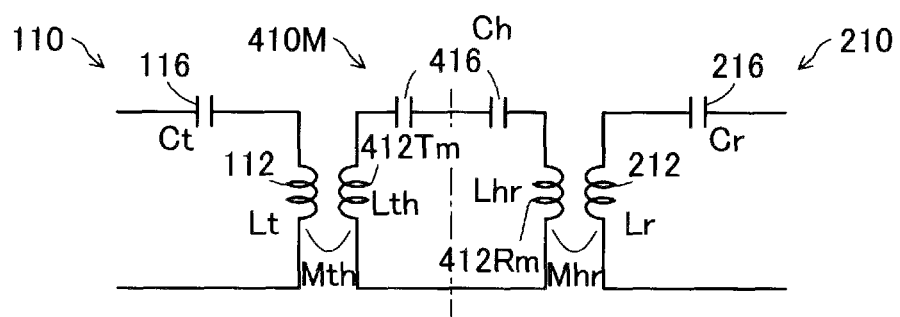
FIG. 23 is a circuit diagram corresponding to the configuration of FIG. 22.

The power transmission resonance circuit 110, the relay resonance circuit 410M, and the power reception resonance circuit 210 can be represented by the circuit shown in FIG. 23 by virtually dividing the resonance capacitor 416 of the relay resonance circuit 410M as in the second embodiment. Let the inductances of the power transmission coil 112, the relay coil 412Tm on the power transmission side, the relay coil 412Rm on the power reception side, and the power reception coil 212 be Lt, Lth, Lhr, and Lr, and the capacitances of the resonance capacitor 116 for power transmission resonance, the resonance capacitor 416 for relay resonance, and the resonance capacitor 216 for power reception resonance be Ct, Ch, and Cr. Further, let the mutual inductance between the power transmission coil 112 and the relay coil 412Tm on the power transmission side be Mth, and the mutual inductance between the relay coil 412Rm on the power reception side and the power reception coil 212 be Mhr.

Figure 24:
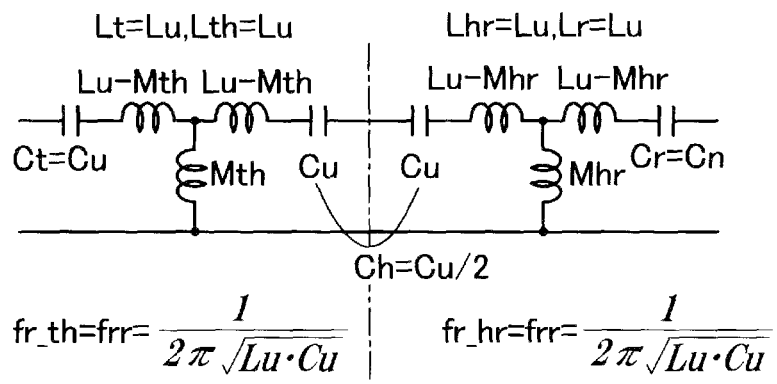
FIG. 24 is an equivalent circuit diagram where the resonance frequencies of the circuit shown in FIG. 23 are all the second resonance frequency.

The circuit shown in FIG. 23 can be represented by the equivalent circuit shown in FIG. 24 similarly to the equivalent circuit shown in FIG. 11. The left side of the alternate long and short dash line shows an equivalent circuit of the resonance part (also referred to as "power transmission side resonance part") formed by the power transmission resonance circuit 110 and the virtually divided power transmission side part of the relay resonance circuit 410M, and the right side of the alternate long and short dash line shows an equivalent circuit of the resonance part (also referred to as "power reception side resonance part") formed by the virtually divided power reception side part of the relay resonance circuit 410M and the power reception resonance circuit 210. In this case, the parameters of the resonance circuits are set so that Lt=Lth=Lhr=Lr=Lu and Ct=Cr=Ch·2=Cu, and the power transmission side resonance frequency fr_th of the power transmission side resonance part and the power reception side resonance frequency fr_hr of the power reception side resonance part are both the second resonance frequency frr.

As shown in FIG. 24, when both the power transmission side resonance frequency fr_th and the power reception side resonance frequency fr_hr are the second resonance frequency frr, and the driving frequency fd is set to the second resonance frequency frr, as with the case of the second embodiment described with reference to FIG. 13, it is possible to abruptly switch between start and stop of transmission, although the power transmission efficiency deteriorates.

Figure 25:
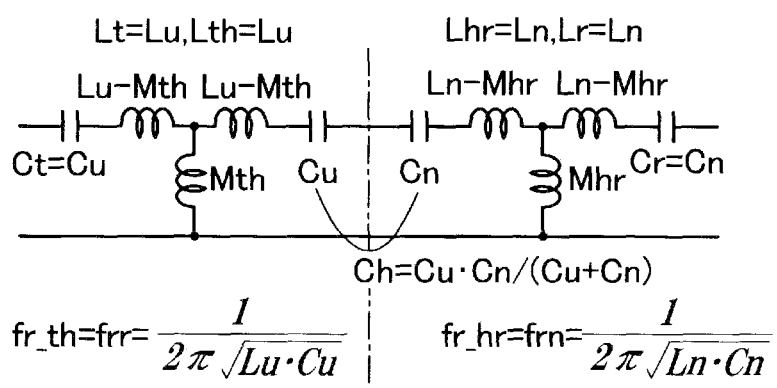
FIG. 25 is an equivalent circuit diagram where the power transmission side resonance frequency is the second resonance frequency, and the relay side resonance frequency and the power reception side resonance frequency are the reference resonance frequency.

To suppress the decrease in power transmission efficiency in the case of the configuration shown in FIG. 24, as shown in FIG. 25, the power transmission side resonance frequency fr_th may be the second resonance frequency frr, the power reception side resonance frequency fr_hr may be the reference resonance frequency frn, and the driving frequency fd may be set to the second resonance frequency frr. With this configuration, it is possible to abruptly switch between start and stop of transmission in the power transmission side resonance part while suppressing the decrease in transmission efficiency in the power reception side resonance part. Thus, it is possible to abruptly switch between start and stop of transmission while suppressing the decrease in transmission efficiency as compared with the case where both the power transmission side resonance frequency fr_th and the power reception side resonance frequency fr_hr are the second resonance frequency frr (see FIG. 24).

When the power transmission side resonance frequency fr_th is to be the second resonance frequency frr and the power reception side resonance frequency fr_hr is to be the reference resonance frequency frn, the parameters of the resonance circuits may be set as shown in FIG. 25. That is, they may be set such that Lt=Lu and Ct=Cu, Lth=Lu, Lhr=Ln and Ch=[Cu·Cn/(Cu+Cn)], and Lr=Ln and Cr=Cn.

FIG. 25 shows a case where the power transmission side resonance frequency fr_th is the second resonance frequency frr, but the power reception side resonance frequency fr_hr may be the second resonance frequency frr. In this case, the parameters of the resonance circuits may be set such that Lt=Ln and Ct=Cn, Lth=Ln, Lhr=Lu and Ch=[Cu·Cn/(Cu+Cn)], and Lr=Lu and Cr=Cu. In this case as well, it is possible to abruptly switch between start and stop of transmission while suppressing the decrease in transmission efficiency.

Note that, in the above description, the second resonance frequency frr is used as an example, but the same applies even if the second resonance frequency frr is replaced with the first resonance frequency frp. In this case, the corresponding parameters of the equivalent circuit can be set by using the inductance and capacitance of when the resonance frequency of a resonance circuit alone composed of an inductance and a capacitance becomes the first resonance frequency frp.

E. Fifth Embodiment

The wireless power transfer systems described in the above embodiments can be applied as various wireless power transfer systems capable of wirelessly transferring power to various power receiving devices. For example, as shown in FIG. 26, they may be applied to wireless power transfer systems for vehicles capable of wirelessly transferring power from a power supplying device 100A to a vehicle 200A as the power receiving device that is traveling on a vehicle traveling path RS or stopped on the vehicle traveling path RS. The vehicle 200A may be, for example, an electric vehicle or a hybrid vehicle. In FIG. 14, the x direction indicates the traveling direction of the vehicle 200A along a lane of the vehicle traveling path RS, the y direction indicates the width direction of the vehicle traveling path RS, and the z direction indicates the vertical upward direction.

As with the power supplying device 100, the power supplying device 100A includes a power supply circuit 140, a power transmission circuit 130, and a plurality of power transmission resonance circuits 110 connected in parallel to the power transmission circuit 130.

Each power transmission resonance circuit 110 includes a power transmission coil 112 placed on the vehicle traveling path RS and a resonance capacitor not shown. The power transmission coils 112 of the power transmission resonance circuits 110 are arranged along the x direction, which is the direction along a lane of the vehicle traveling path RS. Seven power transmission resonance circuits 110 are shown in FIG. 26. Based on the sequence of FIG. 6 described above, whether the vehicle 200A is near these seven resonance circuits is detected to start or stop energization.

Several rows of coils each extending in the X direction may be arranged in the Y direction parallel to each other in order to cope with the variation in the Y direction positions of vehicles.

The vehicle 200A as the power receiving device includes a power reception resonance circuit 210, a power reception circuit 220, and a battery 230.

The power reception resonance circuit 210 is a device including a power reception coil 212 placed in the bottom part of the vehicle 200A and a resonance capacitor not shown, and obtains AC power induced in the power reception coil using magnetic field coupling with the power transmission resonance circuit 110.

The power reception circuit 220 is a circuit that converts the AC power obtained by the power reception resonance circuit 210 into DC power to charge the battery 230 as a load. The electric power charged in the battery 230 is used to drive a motor or the like (not shown).

In order to increase the coupling coefficient between the power transmission coil and the power reception coil, it is also possible to use a means for increasing the size of the coils or a means for bringing the power reception coil closer to the ground.

This vehicle wireless power transfer system also provides effects similar to the systems of the above-described embodiments.

F. Other Embodiments (1) In the above embodiments, wireless power transfer systems having a power supplying device including a plurality of power transmission resonance circuits have been described as examples. However, the present invention is not limited to this, and a wireless power transfer system may have a power supplying device including a single power transmission resonance circuit.

(2) In the above embodiments, examples where the power transmission resonance circuit and power reception resonance circuit use series resonance have been described as examples. However, the present invention is not limited to this, and the power transmission resonance circuit and power reception resonance circuit may use parallel resonance, or one of them may be a resonance circuit that uses series resonance and the other may be a resonance circuit that uses parallel resonance.

(3) In any of the above embodiments, a single shared filter circuit may be provided between the power transmission circuit 130 and the power transmission resonance circuits 110, or a filter circuit may be provided for each power transmission resonance circuit 110. The filter circuit(s) are for suppressing high-frequency noise components such as switching noise included in the AC power supplied from the power transmission circuit 130. The filter circuit may be any of various filter circuits such as an immittance filter circuit, a low-pass filter circuit, and a band-pass filter circuit. The order of the filter circuit may be second order, third order, fourth order or higher. The order of the filter circuit is not limited as long as the noise to be removed can be reduced to a desired level. A filter circuit may also be provided between the power reception resonance circuit 210 and the power reception circuit 220.

(4) In the technique described in connection with the first embodiment, when the inductance of the power transmission coils or the capacitance of the resonance capacitors is variable, this variable system can be used in combination, or the multiplier m can be set small according to the amount of change. For example, if the inductance or capacitance can be reduced to, at a certain k, $1/\alpha$ ($\alpha >= 1$) of the value at k=0 (the power transmission side and the power reception side are far apart from each other), the resonance frequency can be increased by A1α times (see the following equation (11)), and therefore the same effect as increasing the coupling coefficient k to deviate the frequency can be obtained. Thus, combining these effects makes it possible to enhance the effect of deviating the resonance frequency or set the multiplier m small.

The following equation (15) shows the resonance frequency in the case where the inductance or capacitance in the equation (5) has been reduced to $1/\alpha$. As shown by this equation, it is possible to combine the effect of increasing the resonance frequency by A1α times by reducing the inductance or capacitance to $1/\alpha$, and the effect of multiplying the resonance frequency by $1/\sqrt{(1-k)}$ by increasing the coupling coefficient.

[Eq. 15]

[Math. 15]

$$frr(\alpha) = \frac{1}{2\pi\sqrt{(La-M)Ca \cdot (1/\alpha)}} = \frac{\sqrt{\alpha}}{2\pi\sqrt{La \cdot Ca} \cdot \sqrt{1-k}}. \quad (15)$$

(5) In a configuration provided with a relay resonance circuit as described in connection with the second to fourth embodiments, when the inductance of the power transmission coils or the capacitance of the resonance capacitors can be changed, and also the inductance of the coil or the capacitance of the capacitor of the relay resonance circuit can be changed, they may be changed as follows.

For example, in the case of a wireless power transfer system for vehicles (see FIG. 26) where the power transmission coils 112 are placed on or in the ground of the vehicle traveling path, and the power reception coil 212 and the relay coil of the relay resonance circuit are provided in a vehicle, they may be changed as follows. That is, the capacitance of the resonance capacitor or the inductance of the power transmission coil of a power transmission resonance circuit may be changed depending on whether the power transmission coil and the relay coil are coupled to each other.

As another example, in the case of a wireless power transfer system for vehicles (see FIG. 26) where the power transmission coils 112 are buried deep in the ground of the vehicle traveling path, a relay coil is buried near the ground surface, and the vehicle has only the power reception coil 212 or the power reception coil 212 and a relay coil, they may be changed as follows. That is, the capacitance of the resonance capacitor 116 or the inductance of the power transmission coil 112 of a power transmission resonance circuit 110 may be changed depending on whether the relay coil near the ground surface and the power reception coil are coupled to each other, or whether the relay coil near the ground surface and the relay coil in the vehicle are coupled to each other. It is also possible to change not only the capacitance of the resonance capacitor 116 or the inductance of the power transmission coil 112 of the power transmission resonance circuit 110 but also the inductance of the relay coil near the ground surface or the capacitance of the capacitor forming the relay resonance circuit together with the relay coil.

The control units and their methods described herein may be realized by a dedicated computer provided by configuring a processor and a memory programmed to execute one or more functions embodied by computer programs. Alternatively, the control units and their methods described herein may be realized by a dedicated computer provided by configuring a processor with one or more dedicated hardware logic circuits. Alternatively, the control units and their methods described herein may be realized by one or more dedicated computers configured by combining a processor and a memory programmed to execute one or more functions with a processor configured by one or more hardware logic circuits. The computer programs may be stored in a computer-readable non-transitional tangible recording medium as instructions to be executed by the computer.

The present disclosure is not limited to the above embodiments, and can be implemented in various configurations without departing from the spirit of the present disclosure. For example, the technical features of the embodiments corresponding to the technical features of the modes described in "Summary of the Invention" may be replaced or combined as appropriate to solve part or all of the above-described problems, or achieve part or all of the above-described effects. When a technical feature is not described as an essential feature herein, it can be removed as appropriate.

What is claimed is:

1. A wireless power transfer system configured to wirelessly supply power from a power supplying device to a power receiving device, wherein
    the power supplying device includes:
    a power transmission circuit configured to transmit AC power, and
    a power transmission resonance circuit configured to include a power transmission coil,
    the power receiving device includes a power reception resonance circuit including a power reception coil,
    in a state where a coupling coefficient between the power transmission coil and the power reception coil is a predetermined coupling coefficient, resonance of a first resonance mode and resonance of a second resonance mode are generated in the power transmission resonance circuit and the power reception resonance circuit, and the first resonance mode has a first resonance frequency and the second resonance mode has a second resonance frequency, the second resonance frequency being higher than the first resonance frequency,
    a resonance frequency of the power transmission resonance circuit and the power reception resonance circuit is set to a value which is one of the first resonance frequency and the second resonance frequency, and the set value is a frequency which deviates from a reference resonance frequency of the power transmission resonance circuit alone by a predetermined deviation frequency or more, and
    a driving frequency of the AC power is set to the set value which is one of the first and second resonance frequencies and is set as the resonance frequency of the power transmission resonance circuit and the power reception resonance circuit.

2. The wireless power transfer system according to claim 1, wherein
    the power transmission resonance circuit is configured to further include a resonance capacitor,
    a value of a capacitance of the resonance capacitor or a value of an inductance of the power transmission coil is variable both in a case where the power transmission coil and the power reception coil are not coupled to each other, and in a case where the power transmission coil and the power reception coil are coupled to each other at the predetermined coupling coefficient.

3. A wireless power transfer system configured to wirelessly supply power from a power supplying device to a power receiving device, wherein
    the power supplying device includes:
    a power transmission circuit configured to transmit AC power, and
    a power transmission resonance circuit configured to include a power transmission coil,
    the power receiving device includes a power reception resonance circuit including a power reception coil, and
    at least one relay resonance circuit is arranged between the power transmission coil and the power reception coil,
    the relay resonance circuit includes at least one relay coil,
    in a state where a coupling coefficient between the coils included in two adjacent resonance circuits of the power transmission resonance circuit, the relay resonance circuit, and the power reception resonance circuit is a predetermined coupling coefficient, resonance of a first resonance mode and resonance of a second resonance mode are generated in the two adjacent resonance circuits, and the first resonance mode has a first resonance frequency and the second resonance mode has a second resonance frequency, the second resonance frequency being higher than the first resonance frequency,
    a resonance frequency of the two adjacent resonance circuits is set to a value which is one of the first resonance frequency and the second resonance frequency, and the set value is a frequency which deviates from a corresponding reference resonance frequency by a predetermined deviation frequency or more, and a resonance frequency of the resonance circuit other than the two adjacent resonance circuits is set to a reference resonance frequency, and
    a driving frequency of the AC power is set to the set value which is one of the first and second resonance frequencies and is set as the resonance frequency of the two adjacent resonance circuits.

4. The wireless power transfer system according to claim 3, wherein
the power transmission resonance circuit is configured to further include a resonance capacitor,
a value of a capacitance of the resonance capacitor or a value of an inductance of the power transmission coil is variable both in a case where the coils of the two adjacent resonance circuits are not coupled to each other, and in a case where the coils of the two adjacent resonance circuits are coupled to each other at the predetermined coupling coefficient, or
the power transmission resonance circuit is configured to further include a resonance capacitor, and a relay resonance circuit having a fixed relative position with respect to the power transmission resonance circuit is configured to further include a capacitance,
a value of a capacitance of the resonance capacitor of the power transmission resonance circuit or a value of an inductance of the power transmission coil is variable, and also a value of a capacitance of the capacitor of the relay resonance circuit or a value of an inductance of the coil of the relay resonance circuit is variable, both in the case where the coils of the two adjacent resonance circuits are not coupled to each other, and in the case where the coils of the two adjacent resonance circuits are coupled to each other at the predetermined coupling coefficient.

5. The wireless power transfer system according to claim 1, wherein
the deviation frequency is set to a frequency obtained by increasing a half-value width by multiplying the half-value width by a predetermined multiplier, the half-value width being a width of frequencies at which a current flowing through the power transmission resonance circuit alone is half a peak value at a reference resonance frequency of the power transmission resonance circuit alone.

6. The wireless power transfer system according to claim 3, wherein
the deviation frequency is set to a frequency obtained by increasing a half-value width by multiplying the half-value width by a predetermined multiplier, the half-value width being a width of frequencies at which a current flowing through the power transmission resonance circuit alone is half a peak value at a reference resonance frequency of the power transmission resonance circuit alone.

7. The wireless power transfer system according to claim 1, wherein
The value is the second resonance frequency.

8. The wireless power transfer system according to claim 3, wherein
The value is the second resonance frequency.

9. The wireless power transfer system according to claim 1, wherein
the power supplying device includes a plurality of the power transmission resonance circuits connected in parallel to the power transmission circuit.

10. The wireless power transfer system according to claim 3, wherein
the power supplying device includes a plurality of the power transmission resonance circuits connected in parallel to the power transmission circuit.

11. The wireless power transfer system according to claim 9, wherein
the power transmission circuit is activated when the power receiving device is within a predetermined range relative to the power supplying device, and the power transmission circuit is deactivated when the power receiving device is outside the predetermined range.

12. The wireless power transfer system according to claim 10, wherein
the power transmission circuit is activated when the power receiving device is within a predetermined range relative to the power supplying device, and the power transmission circuit is deactivated when the power receiving device is outside the predetermined range.

13. The wireless power transfer system according to claim 1, wherein
the second resonance frequency is set to be three times the first resonance frequency, and
the value is the first resonance frequency.

14. The wireless power transfer system according to claim 3, wherein
the second resonance frequency is set to be three times the first resonance frequency, and
the value is the first resonance frequency.

15. The wireless power transfer system according to claim 1, wherein
the power reception resonance circuit of the power receiving device is a multi-phase power reception resonance circuit.

16. The wireless power transfer system according to claim 3, wherein
the power reception resonance circuit of the power receiving device is a multi-phase power reception resonance circuit.

17. The wireless power transfer system according to claim 1, wherein
the power reception coil has a coreless structure.

18. The wireless power transfer system according to claim 3, wherein
the power reception coil has a coreless structure.

* * * * *